US008035079B2

(12) United States Patent
Hane

(10) Patent No.: US 8,035,079 B2

(45) Date of Patent: Oct. 11, 2011

(54) OPTICAL ENCODER

(75) Inventor: Jun Hane, Tokyo (JP)

(73) Assignee: Olympus Corporation, Tokyo (JP)

(*) Notice: Subject to any disclaimer, the term of this patent is extended or adjusted under 35 U.S.C. 154(b) by 51 days.

(21) Appl. No.: 12/595,722

(22) PCT Filed: Apr. 8, 2008

(86) PCT No.: PCT/JP2008/056925

§ 371 (c)(1), (2), (4) Date: Oct. 13, 2009

(87) PCT Pub. No.: WO2008/126836

PCT Pub. Date: Oct. 23, 2008

(65) Prior Publication Data

US 2010/0165359 A1 Jul. 1, 2010

(30) Foreign Application Priority Data

Apr. 10, 2007 (JP) ................................ 2007-102590

(51) Int. Cl.
*G01D 5/36* (2006.01)
*G01B 11/14* (2006.01)

(52) U.S. Cl. .................................. 250/231.13; 356/615

(58) Field of Classification Search .................. 356/615, 356/616, 494, 499; 250/231.1, 231.11, 231.13, 250/231.16, 239, 237 G See application file for complete search history.

(56) References Cited

U.S. PATENT DOCUMENTS 5,066,130 A * 11/1991 Tsukiji et al. ................ 356/494
5,774,219 A * 6/1998 Matsuura ..................... 356/499
5,889,280 A * 3/1999 Matsuura ................. 250/237 G
6,791,699 B2 * 9/2004 Aoki ............................ 356/616
7,026,654 B2 4/2006 Igaki et al.
7,220,960 B2 * 5/2007 Ito ........................... 250/231.13
7,420,157 B2 * 9/2008 Kuroda .................... 250/231.13
7,649,168 B2 * 1/2010 Hane et al. ............... 250/231.13
2002/0005477 A1 1/2002 Holzapfel et al.
2006/0255252 A1 * 11/2006 Yamamoto et al. ...... 250/231.13
2009/0242742 A1 * 10/2009 Hane et al. ................. 250/231.1

FOREIGN PATENT DOCUMENTS

EP 0 597 705 A1 5/1994
JP 06-221874 8/1994
JP 2002-048600 2/2002
JP 2004-006753 1/2004
JP 2004-045367 2/2004
JP 2005-049345 2/2005
JP 2005-156549 6/2005
JP 2006-170964 6/2006

* cited by examiner

*Primary Examiner* — Sang Nguyen

(74) *Attorney, Agent, or Firm* — Scully, Scott, Murphy & Presser, P.C.

(57) ABSTRACT

An optical encoder includes a scale, and a detecting head which is disposed facing the scale. The scale is provided with a grating which has a predetermined optical pattern with respect to a direction of relative movement, and the detecting head is provided with a light emitting section which irradiates predetermined light to the scale, and a light detecting section which detects a movement of a pattern of light distribution formed on a light receiving surface of a photodetector, by light reflected by the grating upon being irradiated to the scale from the light emitting section. A light transmitting member is disposed on a surface of the light emitting section and the photodetector of the detecting head, toward the scale, and a light propagation controlling pattern for controlling propagation of light is disposed on a surface of the light transmitting member, facing the scale.

15 Claims, 18 Drawing Sheets

Z
Y
162 161 162
170 171
G
131 130 160 180 120 111
150 151 140 110
t2 t1 θ1 θ θ θ2
L

OPTICAL ENCODER

CROSS-REFERENCE TO RELATED APPLICATION

The present application is based upon and claims the benefit of priority from the prior Japanese Patent Application No. 2007-102590 filed on Apr. 10, 2007; the entire contents of which are incorporated herein by reference.

TECHNICAL FIELD

The present invention relates to an optical encoder.

BACKGROUND ART

In recent years, there has been a progress in size reduction and thinning of encoders. While the size of prevalent detecting heads is in a range of 10 mm to 20 mm, optical encoders with detecting heads of a few mm wide in size are also coming out in the market. Because of such a trend of size reduction, it is assumed that even in packaging, size reduction will have the influence over the shape and form of encoders.

For instance, it is assumed that further thinning of conventional packages in which, a metal or ceramics is used, and replacing the conventional packages by packages in which, a packaging technology such as resin molding is used, will be taking place.

As a conventional example of an optical encoder in which, an attention has been paid to the size reduction and slimming, an encoder indicated in patent literature 1 is cited. FIG. 15 shows a cross-sectional view of the encoder of the conventional example.

It is a reflection-type optical encoder which has a light emitting element 42 and photoelectric conversion element arrays 43 and 44 in a detecting head. The light emitting element 42 and the photoelectric conversion element arrays 43 and 44 are covered by a transparent optical member 45, and the transparent optical member 45 is a packaging member as it has been.

In this conventional example, conditions such as the following are added. In other words, when the distance from the light emitting section 42 up to the farthest location of a light receiving surface of the photoelectric conversion element arrays 43 and 44 is let to be D, the distance from the light emitting surface of the light emitting section 42 and the light receiving surface of the photoelectric conversion element arrays 43 and 44 up to the surface of the transparent optical member 45 is let to be G, and the angle at which reflectance of the inner surface of the transparent optical member 45 is 10% is let to be θ, the thickness G is set such that the following expression holds true.

$$G \leqq D/(2 \cdot \tan \theta)$$

For facilitating the size reduction by molding the light emitting section 42 which is a light emitting element of the detecting head, and the photoelectric conversion element arrays 43 and 44 with the transparent optical member 45, when the thickness of the transparent optical member 45 which is a protective member is reduced, light which emerges from the light emitting section 42 will be reflected at an inner surface of the transparent optical member 45 then be incident on the photoelectric conversion element arrays 43 and 44. Therefore, an SN ratio of a signal is deteriorated. Therefore, the thickness of the transparent optical member 45 is let to be not less than a fixed value, and the reflectance of the inner surface of the transparent optical member 45 is let to be not more than 10%.

Patent literature 1: Japanese Patent Application Laid-open Publication No. 2005-156549

DISCLOSURE OF THE INVENTION

Technical Problem

When a size of the detecting head (hereinafter, appropriately called as 'head') becomes smaller, the distance between a light emitting section and a light receiving section inside the head becomes nearer. Therefore, due to stray light etc. inside the head, a possibility that the proportion of the amount of light may increase which emerges from the light emitting section, travels within the inside of the head, and arrives incident on the light receiving section.

When an upper portion of the head is protected by a glass plate, or, when the upper portion of the head is sealed by a transparent resin, there is a possibility that light emerging from a light source, upon being reflected at an inner surface of the upper portion of the head, is incident on the light receiving section.

Particularly, when the thickness of the head is reduced in order to make the head smaller, the angle of reflection at the inner surface of the head becomes larger with respect to an optical path of light from the light emitting section, upon being reflected at the inner surface of the head, and incident directly on the light receiving section. Therefore, if the angle of reflection becomes larger than the angle of total reflection, the amount of light entering the light receiving section increases rapidly. Moreover, light which is multi-reflected at the inner surface of the head also enters the light receiving section.

On the other hand, emerging of light which is not related directly to signal detection, to the exterior of the head, or entering of light which is not related directly to the signal detection, into the inside of the head becomes a factor for increasing the amount of light detected, which is irrelevant to the signal detection, and a factor for releasing leaked light to the exterior.

These kinds of light may become a signal noise in a position-detection signal generating section, and may become a cause of deteriorating extremely the SN ratio of a position signal. When conventional signal amplification is carried out for maintaining the output level, such as amplitude, of the position signal, there is a possibility that the signal level gets saturated by the effect of a noise component.

If an amplifier circuit which eliminates the noise component is added in extra in order to avoid such a possibility, the offset in the circuit will be multiplied, and the offset as a sensor will become larger, thereby making it difficult to use.

Moreover, when an external environment of the encoder is sensitive to light, there is a possibility that the discharge of leaked light becomes a problem. In this case, there is a possibility of arising of a need to consider measures for leaked light.

By taking a large thickness of the transparent optical member in the encoder shown in the abovementioned patent literature 1, an attempt is made to avoid such a problem. However, the size reduction is not necessarily satisfying. Moreover, by taking a large thickness of the transparent optical member, there arises a need to take a large working distance (operating distance) of a detection system. Therefore, there is a possibility that a degree of freedom of designing is lost.

Furthermore, a mold resin has a large change in hardness, thermal expansion and contraction due to a temperature change. Therefore, when packaging of resin molding is used, by enlarging the size, problems such as circuit wire breaks, and an occurrence of a crack are susceptible to occur. Therefore, it becomes difficult to secure reliability, and there is a possibility of a cost becoming high.

The present invention is made in view of the abovementioned circumstances, and the object of the present invention is to provide a small-size thin encoder which is not easily affected by light directly irrelevant to signal detection such as stray light inside the head, light from the exterior, and light leaked to the exterior, or which reduces the effect to the exterior.

Technical Solution

To solve the abovementioned issues and to achieve the object, according to the present invention, there can be provided an optical encoder including a scale which is installed on one member of which, a displacement is detected, and a detecting head which is installed on the other member which moves relatively with respect to the one member, and which is disposed facing the scale, and the scale is provided with a predetermined optical pattern in a direction of relative movement, and the detecting head is provided with a light emitting section which irradiates predetermined light to the scale, a light detecting section which includes a light receiving surface which receives light reflected by the optical pattern upon being irradiated to the scale from the light emitting section, and which detects a light distribution formed on the light receiving surface, and a light transmitting member which is disposed on a surface of the light emitting section and a surface of the light detecting section, toward the scale, and a light propagation controlling pattern for controlling propagation of light is disposed on at least a part of a surface of the light transmitting member, facing the scale.

According to a preferable aspect of the present invention, it is desirable that the light propagation controlling pattern is disposed on a portion of the surface of the light transmitting member, which does not contribute directly to an encoder signal.

Moreover, according to a preferable aspect of the present invention, for a path of light from the light emitting section up to the light detecting section via the light propagation controlling pattern of the surface of the light transmitting member, it is possible to make the light transmitting member thin such that, if it were not for the light propagation controlling pattern, the angle at which at least a part of the light passing through the path of light is incident on the surface of the light transmitting member would be larger than the critical angle of total reflection at the interface between the light transmitting member and the exterior.

Moreover, according to a preferable aspect of the present invention, it is desirable that the light propagation controlling pattern is disposed at an intermediate portion of the surface of the light transmitting member between the two portions where the surface of the light transmitting member intersects with the optical paths related to the displacement detection from the light emitting section up to the surface of the scale and from the surface of the scale up to the light detecting section.

Moreover, according to a preferable aspect of the present invention, it is possible that all the surfaces of the light emitting section and the light detecting section toward the scale are covered entirely and integrally by the light transmitting member, and the upper surface of the light transmitting member is substantially flat, and when the distance from the light emitting section up to the surface of the light transmitting member is let to be t1, the distance from the light detecting section up to the surface of the light transmitting member is let to be t2, the component, parallel to the surface of the scale, of the farthest distance between a position on the light emitting section and a position on the light detecting section is let to be L, the refractive index of the exterior is let to be n1, and the refractive index of the light transmitting member is let to be n2, it is possible to make the thickness such that, $\mathrm{Arc\,Tan}\,[L/(t1+t2)] \geqq \mathrm{Arc\,Sin}(n1/n2)$ is satisfied.

Moreover, according to a preferable aspect of the present invention, it is desirable that, the light emitting section is structured to irradiate predetermined light by a light source and a first grating which is disposed beside the light source, facing the scale, being combined, and that the first grating is formed of a predetermined optical grating which has a first pitch p1 with respect to a direction of relative movement, and the optical pattern of the scale is a second grating formed of an optical grating which has a second pitch p2, and that the light detecting section is structured to detect a movement of the second grating, by a photodetector and a third grating disposed on a light receiving surface of the photodetector being combined, and that the third grating is a predetermined optical grating which has a third pitch p3 with respect to the direction of relative movement, and that a surface on which the first grating is formed and a surface on which the third grating is formed are disposed substantially parallel with respect to the scale.

Moreover, according to a preferable aspect of the present invention, it is desirable that that the light emitting section is structured to irradiate predetermined light, by a light source and a first grating which is disposed beside the light source, facing the scale, being combined, and that the first grating is formed by a predetermined optical grating with a first pitch p1 in the direction of relative movement, and that the optical pattern of the scale is a second grating with a second pitch p2, and that the light detecting section is formed by a photodetector in a form of an array with a third pitch p3 in the direction of relative movement, and the surface on which the first grating is formed and the detecting surface of the photodetector in the form of an array are disposed substantially parallel with respect to the scale.

Moreover, according to a preferable aspect of the present invention, it is desirable that the light emitting section includes a point light source or a line light source, and that the optical pattern on the scale is a second grating with a second pitch p2, and that the light detecting section is structured to detect a movement of the second grating, by an optical detector and a third grating which is disposed on a light receiving surface of the photodetector, being combined, and that the third grating is formed by a predetermined optical grating with a third pitch p3 in the direction of relative movement, and that a surface on which the third grating is formed is disposed substantially parallel with respect to the scale.

Moreover, according to a preferable aspect of the present invention, it is desirable that the light emitting section includes a point light source or a line light source, and that the optical pattern on the scale is a second grating with a second pitch p2, and that the light detecting section is formed by a photodetector in a form of an array with a third pitch 3 in the direction of relative movement, and that, the detecting surface of the photodetector in the form of an array is substantially parallel with respect to the scale.

Moreover, according to a preferable aspect of the present invention, it is desirable that the light transmitting member is a mould resin.

Moreover, according to a preferable aspect of the present invention, it is desirable that the light transmitting member is a plane parallel plate.

EXPLANATION OF NUMERALS

Figure 1:
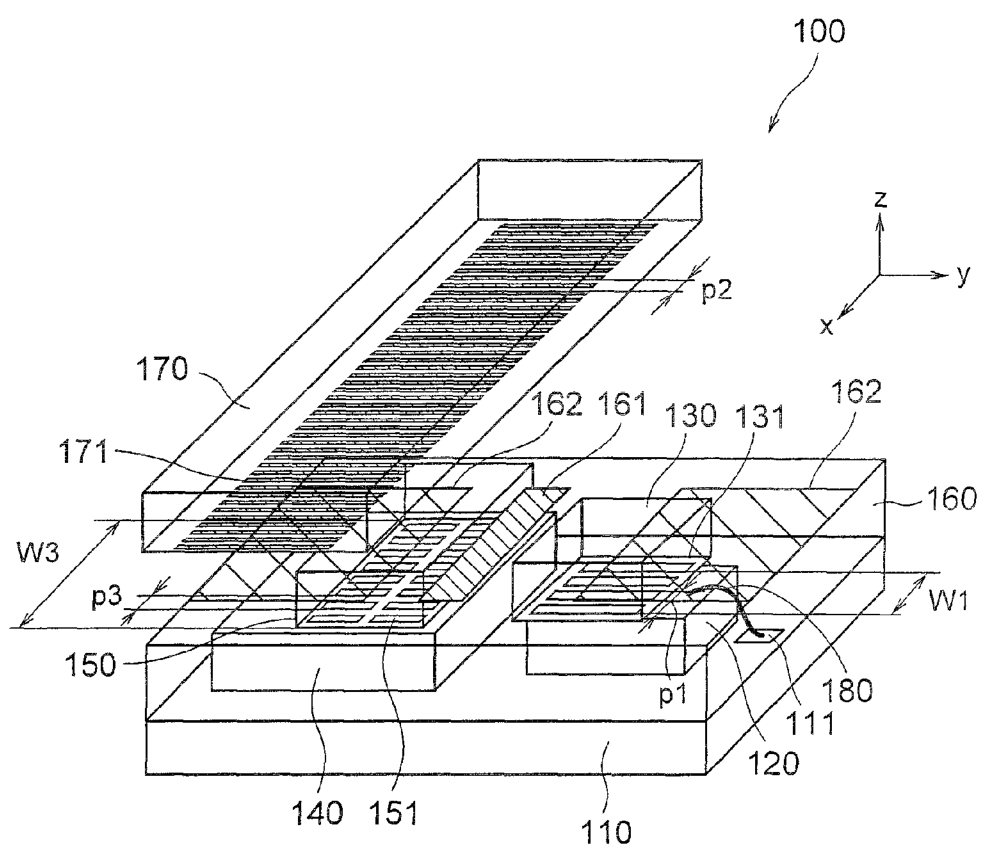
FIG. 1 is a diagram showing a perspective view of an optical encoder according to a first embodiment of the present invention.

100 optical encoder
110 substrate
120 bare LED
130 light transmission substrate
131 first grating
140 photodetector
141 PD array
150 light transmission substrate

151 third grating
160 light transmitting resin
161 optical pattern
162 optical pattern
170 scale
171 second grating
180 electroconductive wire

BEST MODE FOR CARRYING OUT THE INVENTION

Embodiments of an optical encoder according to the present invention will be described below in detail by referring to the accompanying diagrams. However, the present invention is not restricted by the embodiments described below. For example, in the following embodiments, combinations of a detecting head and a scale of a linear type are cited as examples. However, it is also applicable to a scale in the form of a disc and a scale which is formed on the cylindrical surface of a cylinder. When it is not a linear type scale, an optical pattern portion on a scale to which, light is irradiated from a light source related to detection of displacement is a flat plate microscopically, and the optical pattern is considered to have a predetermined pitch microscopically, and the present invention is applicable to the flat plate having an optical pattern with a predetermined pitch, or to a virtually expanded flat plate.

First Embodiment

Figure 2:
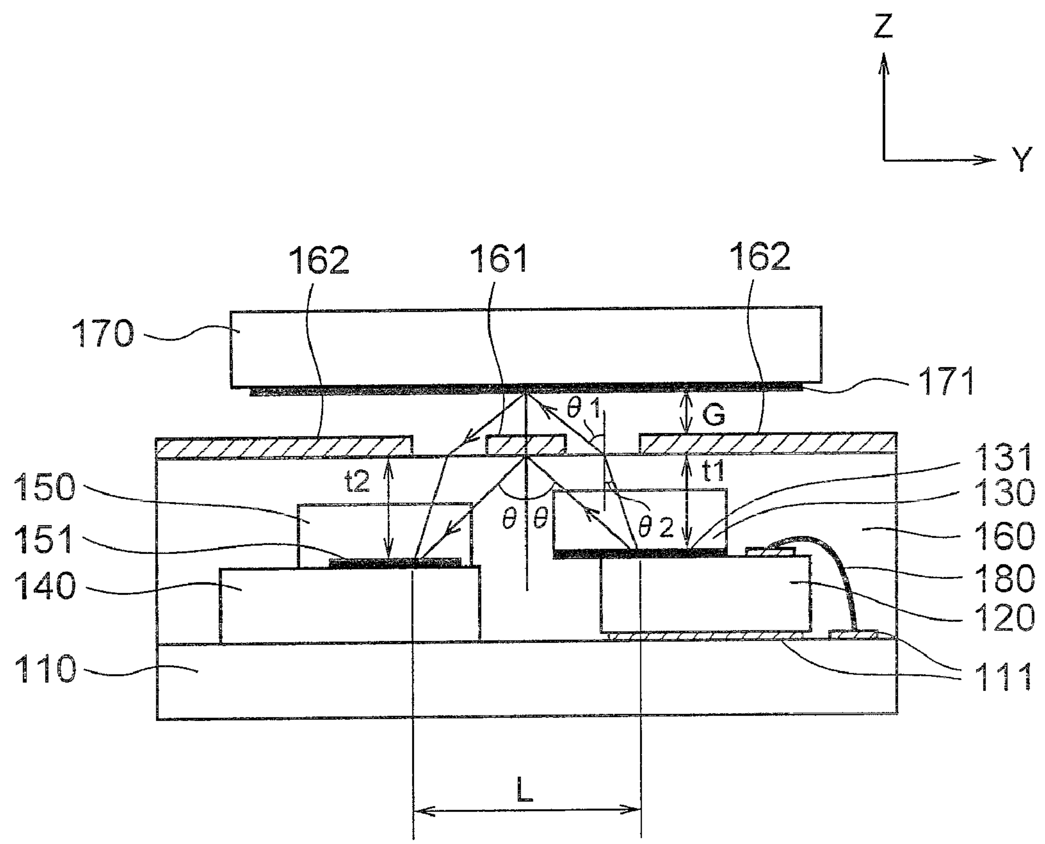
FIG. 2 is a diagram showing a cross-sectional view of the optical encoder according to the first embodiment.

FIG. 1 shows a perspective view of an optical encoder 100 according to a first embodiment. FIG. 2 shows a cross-sectional view of the optical encoder 100. Moreover, in all the embodiments, an xyz rectangular coordinate system shown in FIG. 2 is used.

In FIG. 1, the optical encoder 100 includes mainly seven components namely, a substrate 110, a bare LED 120 which is a bare chip, a light transmission substrate 130 which has a first grating 131 of a pitch p1, a photodetector 140 which has four light receiving sections, a light transmission substrate 150 which has a third grating 151 of a pitch p3, a light transmitting resin 160, and a scale 170 which has a second grating 171 with a pitch p2.

The substrate 110, the light transmission substrate 130 disposed on the substrate 110, the light transmission substrate 130 disposed to be protruding in x-direction and y-direction on the bare LED 120, the photodetector 140 disposed on the substrate 110, and the light transmission substrate 150 disposed on the photodetector 140 are formed integrally as a detecting head. Moreover, an upper portion of the detecting head is embedded by the light transmitting resin 160 of n2 in refractive index.

This encoder 100 is mainly formed of the scale 170 and the detecting head formed on the substrate 110. An atmosphere of n1=1 in refractive index is interposed between the detecting head and the scale 170.

The first grating 131, the second grating 171, and the third grating 151 are disposed to be mutually parallel, in x-direction in the diagram. A portion of a surface of an upper portion of the light transmitting resin 160 through which, at least, light from the bare LED 120 which is a light source passes when the light is incident on the photodetector 140 upon being reflected at the scale 170, is flat, and is formed parallel to the three gratings 131, 171, and 151.

The scale 170 can be displaced relatively only in x-direction in a state that the second grating 171 is parallel to the first grating 131 and the third grating 151.

The substrate 110, the bare LED 120, the light transmission substrate 130, the photodetector 140, and the light transmission substrate 150 are in the form of plane parallel plates. These are formed such that, the tolerance in thickness is about ±20 μm. Moreover, these members are glued one after another, directly on the substrate 110 as shown in FIG. 1 and FIG. 2. Unevenness in thickness of an adhesive which is used for sticking and fixing these members is about ±10 μm or less. Moreover, an upper surface of the light transmitting resin 160 also has almost a flat shape.

In the light transmission substrate 130, the first grating 131 is patterned on almost entire surface on one side of the light transmission substrate 130. Moreover, the first grating 131 is disposed such that the first grating 131 becomes a surface toward LED of the light transmission substrate 130.

In the light transmission substrate 150, the third grating 151 is made of four grating groups, making almost four quarters of a surface on one side of the light transmission substrate 150. Here, the effective width W3 of each grating group in a direction of movement of scale is approximately ½ of the width in the direction of movement of a scale of the light transmission substrate 150. Moreover, the third grating 151 is disposed to be a surface of the light transmission substrate 150, toward the photodetector.

Regarding electrical wiring, the LED 120 and the photodetector 140 are electrically connected to the substrate 110, enabling an operation of the LED 120 and the photodetector 140. There is a plurality of electrodes 111 on the substrate 110, and these electrodes 111 are electrically connected by a gold wire to a predetermined combination of the LED 120 and an electrode pad on the photodetector 140, and are electrically connected to a rear surface of the LED 120 by an electroconductive paste or solder. Moreover, the plurality of electrodes 111 is also electrically connected to a rear surface of the photodetector 140 according to the requirement. Electrodes and wires etc. related to the photodetector 140 are omitted in the diagram. An electrode is formed on an upper surface and a lower surface of the bare LED 120. The electrode on the upper surface and the electrode on the substrate 110 are connected by an electroconductive wire 180. The electrode on the lower surface and the electrode on the substrate 110 are connected by an electroconductive paste. The photodetector 140 and the substrate 110 are also connected by an electroconductive wire. Here the details are omitted.

The following relation holds true for the pitch p1, p2, and p3 of the gratings.

$$p1=p3=2\times p2$$

The third grating 151 is made of four grating groups. Each grating group has a pitch p3, and the four grating groups are disposed such that a phase differs by p3/4 for each grating group.

The photodetector 140 has four light receiving sections not shown in the diagram. Each light receiving section is formed on a surface corresponding to each grating group of the third grating.

Optical patterns 161 and 162 made of a light absorbing pattern are formed on a surface of the light transmitting resin 160, at a head central portion, and an outer peripheral portion other than the head central portion.

The optical pattern 161 is disposed at the head central portion. The optical pattern 161 has at least a reflection preventing function for preventing light of the light source from being incident on the light receiving portion by an internal reflection of the light transmitting resin (light transmitting member) 160. The optical pattern 162 for preventing reflection or preventing transmission is disposed on the outer peripheral portion other than the head central portion.

The optical pattern corresponds to a light propagation controlling pattern for controlling propagation of light. The 'propagation of light' means 'reflection and/or transmission of light'. Moreover, 'to control propagation' means 'to prevent or reduce reflection and/or transmission'. Moreover, the optical pattern indicates a microscopic structure (a structure made of a light transmitting resin, or a structure of another member) formed on a surface of a member (here, light transmitting resin).

In an example in FIG. 2, both the optical patterns 161 and 162 are formed of alight absorbing pattern. The optical patterns 161 and 162 have an effect of reducing both reflected light and transmitted light. In the first embodiment, a light absorbing pattern is used in the optical patterns 161 and 162. However, optical patterns of mutually different functions and types may be disposed.

The optical pattern 161 is formed to be inserted between two intersecting areas of the surface of the light transmitting resin 160 and the optical path from the bare LED 120 as the light source up to the photodetector 140 as the light receiving section via the pattern of the scale 171 on the way and back of the light path, namely on the optical path from the light emitting section up to the surface of the scale and the optical path from the surface of the scale up to the light receiving surface.

Next, light reflected inside the light transmitting resin 160 will be described below. In FIG. 2, an optical path of light emerging from the bare LED 120, then reflecting at the inner surface of the light transmitting resin 160, and further reaching the photodetector 140 is shown.

This light path is a path when the optical pattern 161 does not exist. When the distance in the horizontal direction, the direction perpendicular to Z in the diagram, from a light emerging portion of the bare LED 120 up to the light receiving surface of the photodetector 140 is let to be L, the distance in Z direction from a light emerging portion of the bare LED 120 up to the surface of the light transmitting resin 160 is let to be t1, the distance in Z direction from the surface of the light transmitting resin 160 up to the light receiving surface of the photodetector 140 is let to be t2, and the angle of reflection at the surface of the light transmitting resin 160 is let to be θ, the following expression holds true.

$$L=(t1+t2)\cdot\tan\theta \quad \text{(expression 1)}$$

Here, refractive indexes of the light transmission substrate 130, the light transmission substrate 150, and the light transmitting resin 160 are all n. In addition, t1, t2, and L are disposed to satisfy the following expression.

$$\mathrm{Arc\ Tan}\,[L/(t1+t2)]\geqq \mathrm{Arc\ Sin}(n1/n2) \quad \text{(expression 2)}$$

Arc Sin (n1/n2) is the angle of total reflection. Consequently, when the optical pattern 161 is not formed, in an optical path of light from the light source, reaching up to the photodetector 140 upon being reflected at the optical pattern, the thickness is such that, the light is subjected to total reflection at least at a part of the surface of the light transmitting resin 160.

In this case, for simplification, the refractive indexes of the light transmission substrate 130, the light transmission substrate 150, and the light transmitting resin 160 are let to be the same. However, it is also applicable when the refractive indexes are different. The angle of reflection at the interface between the light transmitting resin 160 and the air is let to be θ under the assumption that the optical pattern 161 is not formed.

Therefore, at least for a part of an optical path of light emerging from a light emerging portion, and reaching the light receiving surface upon being reflected at the upper surface of the light transmitting resin 160, a structure and arrangement may be made such that the angle of reflection θ is more than the angle of total reflection of the optical path Arc Sin (n1/n2).

For concrete calculation of the distance L, when the refracting index and thickness of a member interposed at i-th position along the path are let to be ni and ti, t1 and t2 may be obtained by converting the refractive index n of the light transmitting resin 160 to Σ(ti·n/ni).

It is not sufficient that expression 2 holds true. When the thickness of the light transmitting resin 160 is extremely thin, and the distance L is relatively long, it is possible that an optical path of light emerging from the bare LED 120 and reaching the photodetector 140 upon being reflected inside the light transmitting resin 160 does not exist.

In the first embodiment, it is assumed that there exists light which emerges at least from the bare LED 120 and reaches the photodetector 140 upon being reflected at the inner surface of the light transmitting resin 160. In other words, when the distance from the surface of the light transmitting resin 160 up to a surface of the optical pattern of the scale 170 is let to be ta, it is assumed that an optical path for which the following expression holds true exists.

$$\text{Arc Tan}\,[L/(t1+t2+ta\times 2/n)] \geqq \text{Arc Sin}(n1/n2) \qquad \text{(expression 3)}$$

There are two main objects of the optical pattern 161 namely, preventing reflection and preventing transmission. The following are examples of types of optical patterns with the object of preventing reflection. Low-reflection light transmission pattern, light absorption pattern, diffused reflection pattern, and direction of reflection bending pattern.

An example of the low-reflection light transmission pattern is a reflection preventing film which functions by the differences in refractive indexes of a multi-layer film, and an example of the direction of reflection bending pattern is a diffraction pattern. Furthermore, examples of methods of manufacturing and structures of an optical pattern are pattern transfer technology, patterning by printing or photolithography, patterning by concavities and convexities, patterning by machining, and patterning by sticking of a member having an optical pattern.

As the optical pattern 161, even with a structure other than the abovementioned structure, a type which has an effect of preventing reflection, and which can be adopted may be used. Moreover, preventing reflection may not prevent the reflection completely, but may reduce reflectivity. Moreover, it may be a pattern which has a function other than preventing reflection.

Moreover, optical patterns with an object of preventing transmission include patterns such as a high-reflection pattern and a light absorption pattern. From a point of preventing and reducing light transmitted in a specific direction, the diffused reflection pattern and the direction of reflection bending pattern are effective.

Figure 3:
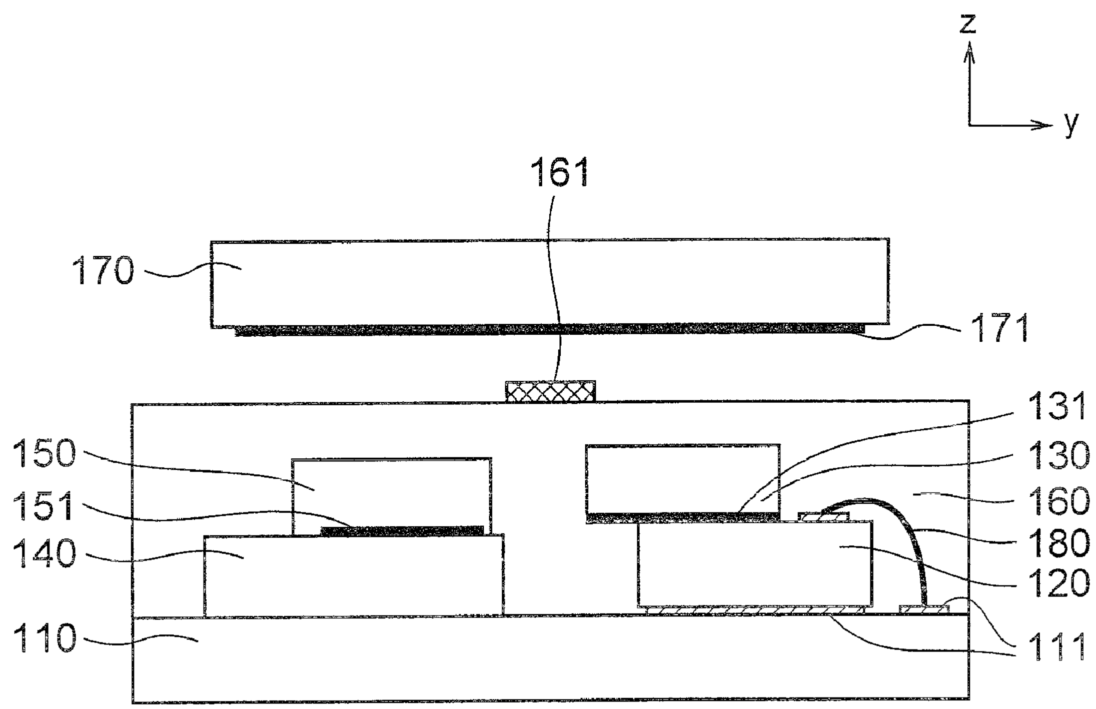
FIG. 3 is a diagram showing a cross-sectional view of an optical encoder according to a modified embodiment of the first embodiment.
Figure 4:
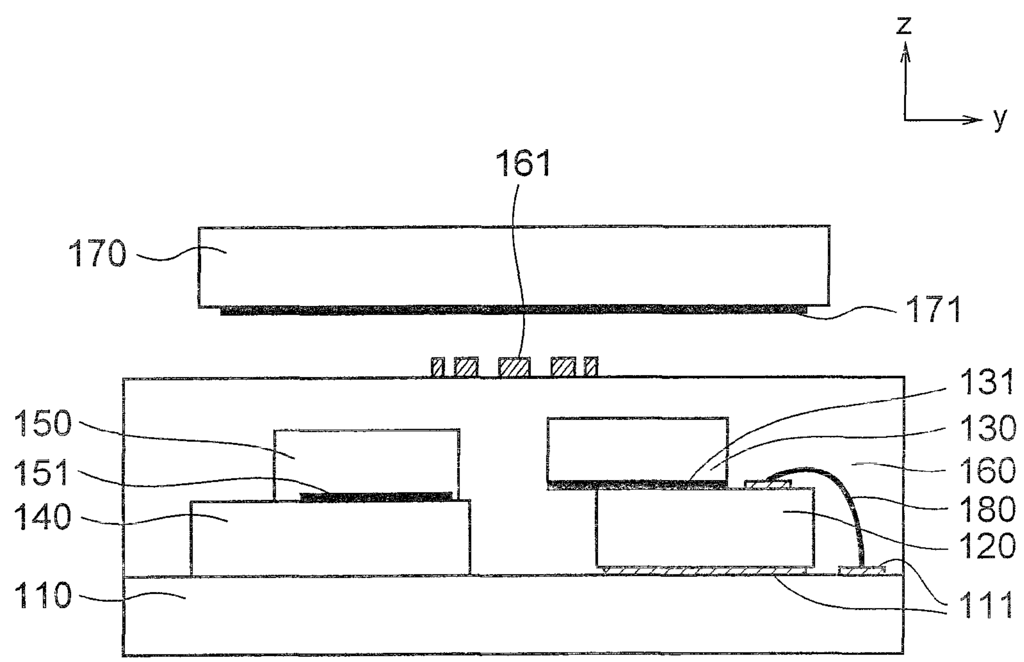
FIG. 4 is a diagram showing a cross-sectional view of an optical encoder according to another modified embodiment of the first embodiment.
Figure 5:
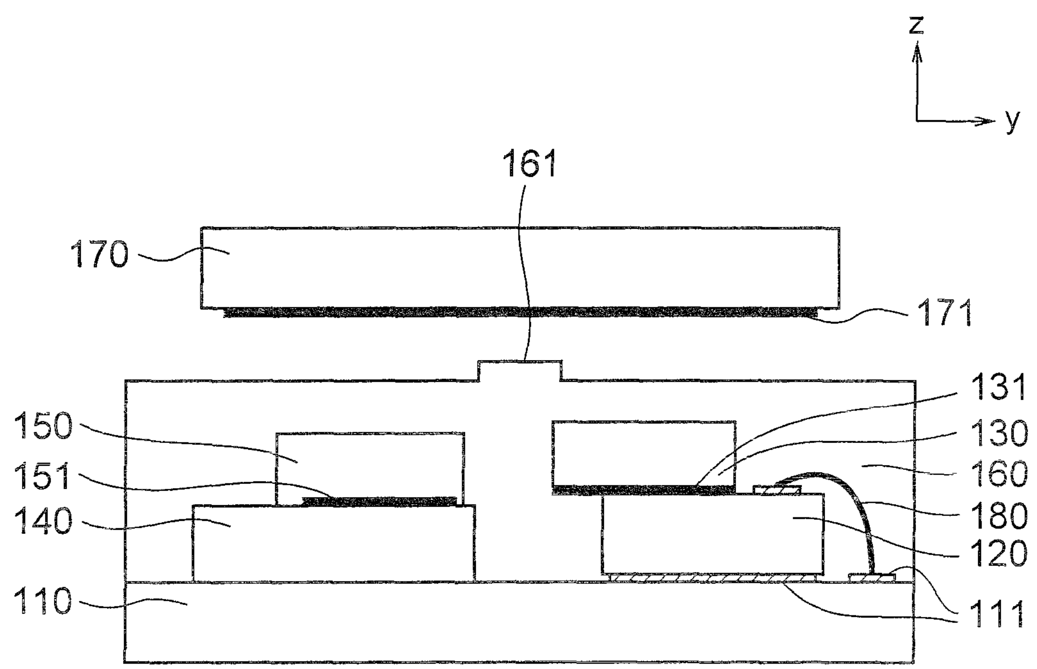
FIG. 5 is a diagram showing a cross-sectional view of an optical encoder according to still another modified embodiment of the present invention.

In an example in FIG. 2, the light absorption pattern is adopted as an optical pattern with the object of preventing reflection as mentioned above. Moreover, without restricting to this, it is also possible to have other modified embodiments. For example, as shown in FIG. 3, it is also possible to use the diffused reflection pattern as the optical pattern 161. Furthermore, as shown in FIG. 4, it is also possible to use a concentric elliptical-shaped pattern which converges light faraway from a light receiving area. Moreover, as shown in FIG. 5, as the optical pattern 161, it is also possible to use a projection pattern having a convex shape.

The optical pattern 161 is formed on the surface of the light transmitting resin 160, and is an intermediate portion of two portions at which, an optical path from the light emitting portion of the bare LED 120 up to the surface of the scale, and an optical path from the surface of the scale 170 up to the light receiving surface intersect.

It is desirable that the optical pattern 161 is disposed at any part of the surface which does not have any effect on an AC component (amplitude component) of detection signals and which has an effect on a component due to an internal reflection. Moreover, on the surface of the light transmitting resin 160, sometimes, the portion which has an effect on the component and the portion which has an effect on the component due to the internal reflection intersect.

Therefore, the structure can be modified by making the area with the optical pattern 161 slightly smaller or larger as compared to the entire area which has an effect on the DC component, depending on a reason in manufacturing or characteristics of the encoder. Moreover, it is immaterial even if the effect of preventing reflection varies according to location.

The optical pattern 162, as shown in FIG. 1 and FIG. 2, is formed on the outer side of a portion of the upper surface of the light transmitting resin 160, which contributes to the generation of detection signals. Here, the optical pattern 162 may be provided also on a portion of the upper surface of the light transmitting resin 160 which is outside the area that contributes to the generation of detection signals. Types, manufacturing methods, and structures of the optical pattern 162 are similar to those of the optical pattern 161.

From a viewpoint of preventing stray light, it is desirable that the optical pattern 162 is a low-reflection light transmission pattern or the light absorption pattern. Particularly, the light absorption pattern which does not let excessive light to surrounding is favorable provided that, there is no problem of temperature rise due to light absorption. On the other hand, the light transmission preventing pattern is desirable for preventing the effect of external light or discharged light.

Next, an optical path which contributes to signal detection will be described by using FIG. 2. The angle of incidence on the surface of the light transmitting resin 160 from the light emitting portion of the bare LED 120 is let to be θ2, the angle of emergence is let to be θ1, the angle of incidence on the surface of the light transmitting resin 160 via the scale 171 is let to be θ1, the angle of emergence is let to be θ2, the distance between the surface of the light transmitting resin 160 and the scale is let to be G, and the angle of incidence 82 when the reflectance of light directed to the scale 170 from the inside of the light transmitting resin 160 is 10% is let to be θ2*a*, θ1 when θ2=θ2*a*, is let to be θ1*a* (θ1=θ1*a*). Furthermore, the minimum value of L is let to be Lmin and the maximum value of L is let to be Lmax. In this case, the following expression holds true.

$$\sin\theta 1 = n\cdot\sin\theta 2 \qquad \text{(expression 4)}$$

Expression 4 is an expression based on Snell's law for light which is incident on and exits from the surface of the light transmitting resin 160.

Next, a condition for light emerging from the light emitting portion of the bare LED 120 to reach the light receiving surface of the photodetector 140 via the scale 170 will be described below.

$$L\text{min} < 2G\cdot\tan\theta 1a + (t1+t2)\cdot\tan\theta 2a \qquad \text{(expression 5)}$$

$$L\text{max} < 2G\cdot\tan\theta 1a + (t1+t2)\cdot\tan\theta 2a \qquad \text{(expression 6)}$$

In expression 5, Lmin which is the minimum value of L is the component in a horizontal direction of the distance of the nearest points between the light emitting portion of the bare LED 120 and the light receiving surface of the photodetector 140. Lmax, which is the maximum value of L, is the component in a horizontal direction of the distance of the farthest points between the light emitting portion of the bare LED 120 and the light receiving surface of the photodetector 140.

Expression 5 is a condition for light passing through an optical path for which, reflectance of light from the internal portion of the light transmitting resin 160 directed toward the scale 170 is 10% or less, to reach the light receiving surface of the photodetector 140. Moreover, expression 6 is a condition for light passing through an optical path for which, the reflectance of light from the internal portion of the light transmitting resin 160 directed toward the scale 170 is 10% or less, to reach the light receiving surface of the photodetector 140.

When the reflectance of light from the internal portion of the light transmitting resin 160 directed toward the scale 170 surpasses 10%, the reflectance is susceptible to change rapidly. Moreover, signal amplitude of detection signals based on the transmitted light changes largely, and particularly, is susceptible to decrease.

For achieving stable detection signals, a condition that the reflectance of light from the internal portion of the light transmitting resin 160 directed toward the scale 170 is 10% or less is used. This figure of 10% may be somewhat smaller or somewhat larger according to an encoder which the number is applied for.

Unless at least expression 5 is satisfied, it is not possible to detect at all any signals for the light whose reflectance at the interface from the internal portion of the light transmitting resin 160 directed toward the scale 170 becomes 10% or less. Moreover, when expression 6 is satisfied, when light to be detected at the light receiving surface of the photodetector 140 is transmitted from the internal portion of the light transmitting resin 160 to the scale 170 becomes 10% or less. In the first embodiment, it is assumed that both expression 5 and expression 6 are satisfied.

Various modifications and substitutions are possible for various components of the embodiments of the present invention. For the light source, an example of a bare LED has been cited. However, a light source of a bare chip type which is capable of forming a diffraction image, such as a plane emission laser serves the purpose.

Glass is commonly used as a material of the light transmission substrate (light transmitting member) which has the first grating 131. However, a resin such as PET and polyimide, and a thin film of a metal may also be used. Moreover, an example in which, the light receiving portions are used separately for the four grating groups having different phase in detection, of the third grating 151 has been cited. However, it may be a type in which, two grating groups are used or one grating group is used.

Moreover, a light shielding portion may be provided such that light does not pass through a surrounding portion of the patterning area of the first grating 131 of the light transmission substrate 130.

An optical pattern member in the first embodiment is a restricted example, and it may be any structure provided that it is a structure which reduces light incident on the photodetector 140 upon being reflected internally, at an upper portion of the light transmitting resin 160, after emerging from the light source, and which reduces leaked light leaked to the exterior, and external light which is incident on the photodetector. Moreover, a method of manufacturing thereof is immaterial.

For example, a plurality of abovementioned components may be disposed, or the abovementioned components may be disposed upon combining. Moreover, as shown in FIG. 5, a shape of the optical pattern 161 may be let to be a lens shape having a convexity in an upper direction, a cylindrical lens shape, or cross-sectional shape of an English alphabet V turned upside down.

A structure of the first embodiment is a structure which detects an amount of relative movement, but it is also possible to dispose additionally a member for detecting a reference position, on a detecting head and a scale, particularly, a member such as a light source, a detecting section, and an optical pattern.

Furthermore, by disposing in plurality, gratings from the first grating to the third grating of the first embodiment, or a part thereof, it is possible make a structure which detects a displacement in the same direction by a plurality of detecting systems, or which detects simultaneously a displacement in a plurality of directions which are orthogonal.

Next, an operation of the present invention will be described below. Light emerges from the bare LED 120 which is a light source. This light passes through the first grating 131 formed on the light transmission substrate 130. Moreover, the light is irradiated to the second diffraction grating 171 on the scale 170.

Furthermore, the light is reflected and diffracted at the second grating 171. A diffraction image of the second grating 171 is formed on the third grating 151 which is formed on the light transmission substrate 150. The diffraction image is an image in which, the second grating 171 is magnified to double, and light of the diffraction image passed through the third grating 151 is detected at the light receiving surface of the photodetector 140. When the scale 170 moves relatively in x-direction with respect to the detecting head, the diffraction image moves in x-direction on the third grating 151. Therefore, periodic quasi sine-wave signals are achieved from the photodetector 140.

In other words, the light detecting section is structured to have a predetermined optical grating function having a third pitch p3 with respect to the direction of relative movement, and to detect a movement of a magnified projected image which is formed by the second grating being magnified to a predetermined magnification, based on the relative movement, and to output periodic signals according to the amount of relative displacement of the scale.

Four signals with a phase difference of 90° are obtained from the photodetector 140. It is possible to achieve two signals with a phase difference of 90° by taking the difference between the signals with a phase difference of 180°—there are two sets of signals—according to the requirement. Since expression 5 and expression 6 are satisfied, the reflectance of the entire light detected at the light receiving surface of the photodetector 140 is 10% or less when the light passing from the internal portion of the light transmitting resin 160 to the scale 170. Therefore, it is possible to achieve a stable detection signal level.

Next, an operation for each optical pattern in the first embodiment of diagrams from FIG. 2 to FIG. 5 will be described below. In an example in FIG. 2, the light absorption pattern is adopted for the optical pattern. Therefore, light reflected at the inner surface of the light transmitting resin 160 is absorbed. Moreover, light transmitted from the internal portion to the exterior and from the exterior to the internal portion are also absorbed.

In an example in FIG. 3, light reflected at the inner surface of the light transmitting resin 160 is scattered by the diffused reflection pattern. Moreover, in a specific area of the outer surface, it is possible to reduce external light passing through that area and leaked light from that area to the exterior.

In an example in FIG. 4, it is possible to guide the light reflected at the inner surface of the light transmitting resin 160 to a position away from the light receiving area, by a concentric elliptical pattern which converges the light farther from the light receiving area. Moreover, in a specific area of the outer surface, it is possible to guide external light from that area, to a position away from the light receiving area, and to deflect the light leaked through that area.

In an example in FIG. 5, most of light which has reached the projection pattern having a convex shape is repeatedly reflected inside the projection pattern, or is transmitted to the exterior of resin. According to these actions, light reaching the light receiving surface of the photodetector 140 upon being reflected inside the light transmitting resin 160 is reduced. Moreover, in a specific area outside, it is possible to reduce the external light coming inside from that area, and the light leaked outside through that area.

Figure 6:
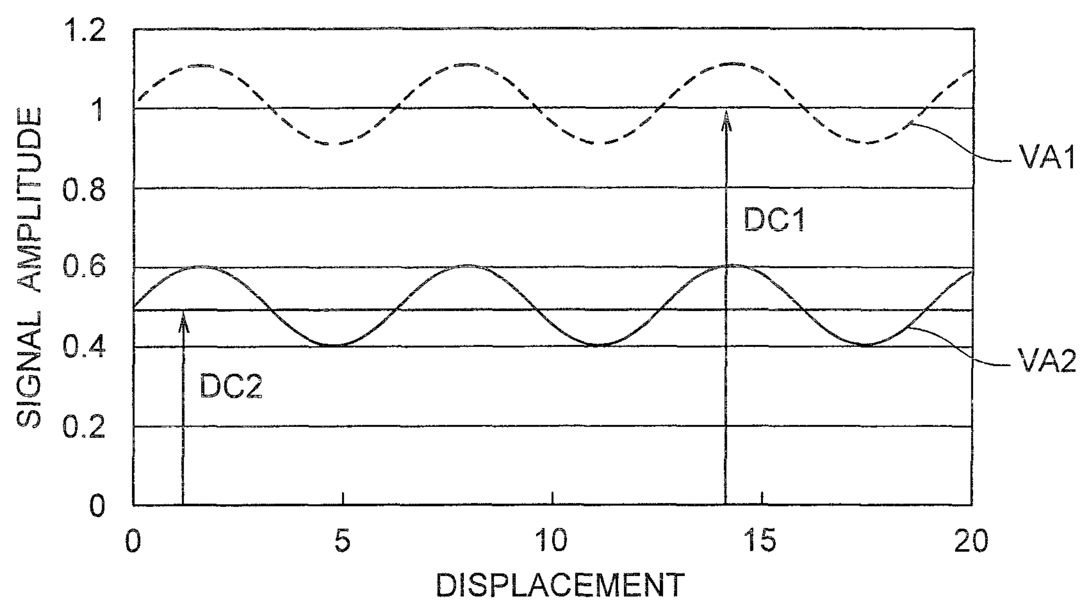
FIG. 6 is a diagram showing a relationship of an optical pattern and a DC component.

FIG. 6 shows an effect of the optical pattern 161 taking as an example one of four signals with a phase difference of 90° obtained from the photodetector 140 before taking a difference between signals with different phase as mentioned above. Two quasi sine waves VA1 and VA2 are shown. The two signals have the same amplitude but different fixed components DC1 and DC2.

Out of the two quasi sine waves, the quasi sine wave VA1 shown by a broken line, having the greater DC component DC1, is a signal when the optical pattern 161 is not formed. On the other hand, the quasi sine wave VA2 shown by a solid line, having the smaller DC component DC2, is a signal when the optical pattern 161 is formed.

A reason for the difference in the detection signal due to presence or absence of the optical pattern in this manner will be described below. When the optical pattern 161 is not formed, even in a state of the scale 171 not existing, a DC component due to internal reflection inside the light transmitting resin 160 occurs.

An AC component, the target for detection, which changes periodically based on the relative displacement, and a DC component other than the AC component, are further added to the signal by disposing the scale 170 at a predetermined position. On the other hand, when the optical pattern 161 is disposed appropriately, the DC component due to the internal reflection inside the light transmitting resin even in a state of absence of the scale 170 is reduced. Therefore, the proportion of the DC component to the detection signal decreases largely. Similarly, the optical pattern 162 also plays a role of preventing stray light inside the light transmitting resin 160.

In FIG. 6, for making it easily visible, an example is shown in which the proportion of signal amplitude compared with the DC component is relatively large. For the same signal amplitude of 0.2 p-p (peak-to-peak), the signal level of the DC component DC1 when the optical pattern 161 is not formed is 1, and the signal level of the component DC2 when the optical pattern 161 is formed is 0.5. Practically, due to the effect of totally reflected light inside the light transmitting resin 160, sometimes the proportion of the DC component is ten times or more.

Next, the effects of the present invention will be described below.

When the thickness of the head is reduced in order to make the head smaller, the angle of reflection at the inner surface of the head becomes larger with respect to an optical path of light from the light emitting section, upon being reflected inside the head, and incident directly on the light receiving section. Therefore, when the angle of reflection becomes larger than the angle of total reflection, the amount of light entering the light receiving section increases rapidly.

Even in the first embodiment, such structure is used, and expressions from expression 1 to expression 6 are satisfied. Furthermore, the optical pattern 161 is disposed between two portions at which, an optical path from the light source up to the light receiving section through the optical pattern, and the surface of the light transmitting resin 160, for going and returning of light, and the optical pattern 162 is disposed at an outer peripheral portion on the upper surface of the light transmitting resin 160.

It is possible to reduce the effect of the external light and the effect of the light reflected at the internal portion of the light transmitting resin 160 by the optical patterns 161 and 162. Therefore, it is possible to achieve signals with better S/N ratio. Moreover, in signal processing, a problem such as saturation of a signal level hardly occurs when a signal is amplified in order to generate a position signal having a desired amplitude level. If an amplifier for eliminating the DC component is not added for avoiding the problem of saturation of the signal level during signal amplification, a problem such as the offset as a sensor becoming large, which is caused by the multiplied offset of the amplifier, does not arise. Particularly, even when signal amplitude of the detection signal is small, and the proportion of the DC component for the signal amplitude is large, it is possible to take a large amplification level of signal amplitude. In this case, the structure of the present invention is extremely effective.

According to the abovementioned structure, thinning and size reduction of the detecting head becomes possible by disposing the optical head 161. Furthermore, designing of an encoder with a small working distance also becomes possible, and it is possible to make a degree of freedom of designing high.

Moreover, it is possible to reduce the effect of the leaked light by the optical patterns 161 and 162. Therefore, when an environment in which, unnecessary light is not desired to be discharged to the exterior, such as a light receiving element, is around, measures for leaked light are unnecessary, and it is possible to serve the purpose by simple measures.

Since the optical patterns 161 and 162 which are light propagation controlling patterns are formed on the upper surface of the detecting head, it is possible to form at the end of a manufacturing process of the detecting head. Consequently, it is possible to facilitate improvement in function without a change of members other than the optical pattern. For forming the optical pattern, it is possible to use a process which is comparatively easier and particularly suitable for mass production such as, photolithography and by using a mold having convexity and concavity. Moreover, it is easy to modify and add the light propagation controlling pattern and an applicable portion.

Accordingly, by the optical pattern formed on the upper surface of the detecting head, while it is expensive and suitable and easy for making an application and modification, it is possible to avoid saturation of the detection signal level and to improve the SN ratio. It is also possible to make the detecting head thin and small in size, and to reduce the effect of leaked light.

Since the optical patterns 161 and 162, the light propagation controlling patterns, are disposed on a portion of the surface of the light transmitting member, which does not contribute directly to the encoder signals, position detection as an encoder is possible without deteriorating the detection signals and lowering the level of the detection signals.

The optical pattern 161, the light propagation controlling pattern, is disposed at an intermediate portion of the surface of the light transmitting member between the two portions where the surface of the light transmitting member intersects with the optical paths related to the displacement detection from the light emitting section up to the surface of the scale and from the surface of the scale up to the light detecting section. It is possible to reduce the DC component of signals which are generated by the light reflected at the intermediate portion and detected at the photodetector 140, which does not contribute directly to the encoder signals. Therefore, it is possible to avoid saturation of the detection signal level, and to improve the SN ratio.

In the first embodiment, regarding the path of light from the light emitting section up to the light detecting section via the light propagation controlling pattern of the surface of the light transmitting member, if it were not for the light propagation controlling member, the angle at which at least a part of the light passing through the path of light is incident on the surface of the light transmitting member, would be larger than the critical angle of total reflection at the interface between the light transmitting member and the exterior. Moreover, the structure satisfies expression 2. Consequently, if the optical pattern 161, the light propagation controlling pattern, is not there, the light which is subjected to total reflection will be incident on the light detecting section 140, which may cause problems such as the saturation of the detection signal level and deterioration of SN ratio. The bare LED 120 is a light source nearest to the photodetector 140, and the DC component of the encoder signals which totally reflected light generates may be particularly large as compared to other stray light. By the DC component being reduced by the light propagation control with the optical pattern 161, the encoder signals can be detected stably. Consequently the thinning and size reduction of the detecting head becomes possible.

Since it is a compact structure in which, small-size optical components such as the bare LED 120 which is a light source, the photodetector 140, and the light transmission substrates 130 and 150 are assembled directly on a substrate, small-sizing of the detecting head while achieving stable encoder signals by reducing the DC component is possible.

An example in the first embodiment is called as a triple-grating encoder having altogether, the first grating 131 beside the light source of the detecting head, and the third grating beside the photodetector, and the second grating 171 on the scale 171. The triple-grating encoder, currently, is a typical structure of the encoder, and a highly accurate defection is possible.

A sensor head in which, packaging of resin molding is adopted is low-cost and suitable for mass production. Particularly, in the first embodiment, it is possible to adopt a method of manufacturing in which, a large number of heads is resin molded simultaneously and then cut into separate fragments. According to this, it is superior for mass-productiveness from a point of carrying out mold formation collectively.

Moreover, by reducing the thickness of the resin molding package as indicated in expression 2, it is possible to lessen problems such as wire break of a circuit wire, and an occurrence of a crack which arise due to a large change in hardness and thermal expansion and contraction during a change in temperature. Therefore, it becomes easy to secure reliability.

In the first embodiment, by using a bare-chip component for the light source and the light receiving section, it is possible reduce the area of mounting, and thickness. Furthermore, by using a bare LED, it is possible to make a length of a light emerging portion of the light emitting section small to few tens of μm to about 200 μm. Accordingly, it is possible to make small even the area of the light transmission substrate 130 disposed on the bare LED. Therefore, it is advantageous for small-sizing and thinning.

Furthermore, by sealing the detection head by resin, the head may not be affected by the atmospheric pressure easily, and it may become possible for the head to be used in vacuum or under a high pressure.

Second Embodiment

Figure 7:
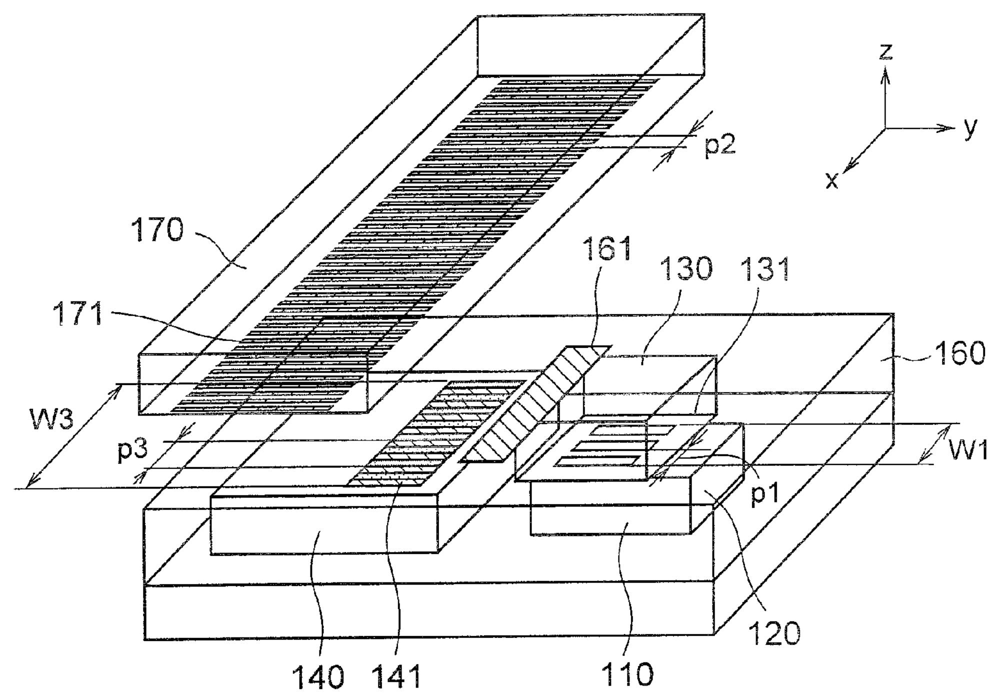
FIG. 7 is a diagram showing a perspective view of an optical encoder according to a second embodiment of the present invention.
Figure 8:
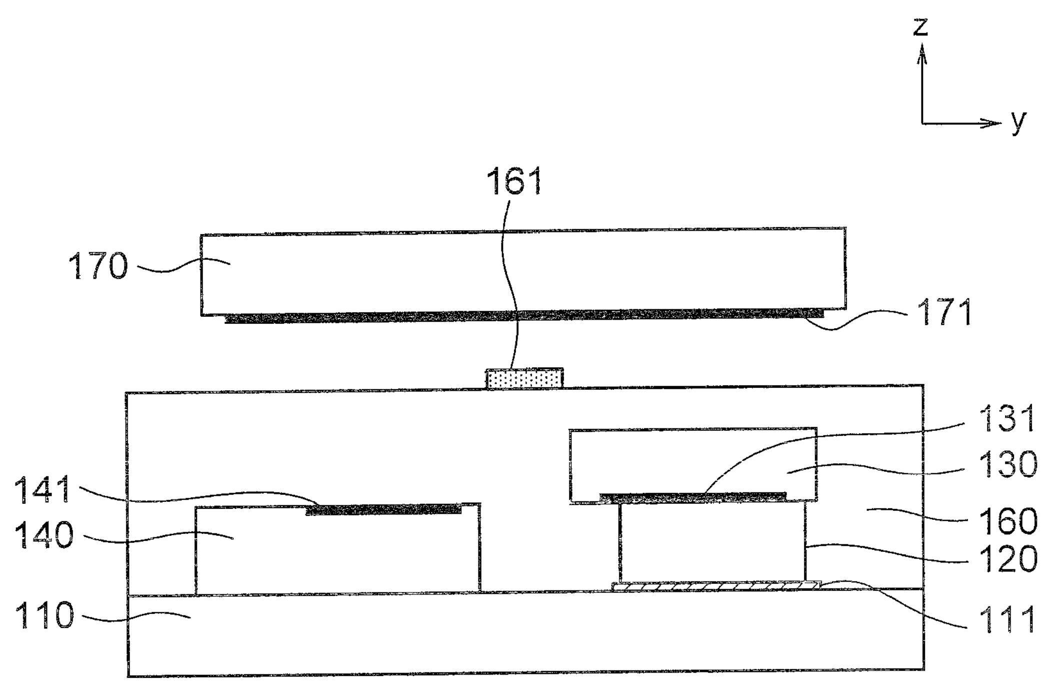
FIG. 8 is a diagram showing a cross-sectional view of the optical encoder according to the second embodiment.

Next, an optical encoder according to a second embodiment of the present invention will be described below. The same reference numerals are assigned to the components which are the same as in the first embodiment, and redundant description is omitted. FIG. 7 and FIG. 8 show a perspective view and a cross-sectional view respectively, of the optical encoder of the second embodiment.

In the second embodiment, instead of the bare LED 120 which is a light source in the first embodiment, it is let to be a mold LED 120 of a surface-mounting type, and the light transmission substrate 150 having the photodetector 140 and the third grating 151 is replaced by a photodetector 140 having a PD array 141. By letting it to be the mold LED 120 of the surface-mounting type, since wires are accommodated on the substrate 110, connections by gold wires etc. become unnecessary.

The light transmission substrate 130 is disposed such that the first grating 131 becomes a surface toward the light transmission substrate 130. Similarly, in the photodetector 140, the PD array 141 is formed on an upper surface of the photodetector 140, toward the scale 170. The PD array 141 occupies a partial area of the photodetector 140. Moreover, in the PD array 141, light receiving portions of the same shape are arranged at a pitch (p3)/4, and are connected in groups of four. Accordingly, signals of four different phases, each having a phase difference of (p3)/4 are generated. A pitch for each phase group is p3, and the effective width W3 in a direction of movement of scale is equal to the length of the PD array 141.

PD array 141 is a component in which, a photodetector and a third grating are integrated. With this structure, a function of a triple slit as mentioned above is realized as it is. Even in this example in which the PD array is used, the light detecting section is structured to have a predetermined optical grating function having a third pitch p3 with respect to the direction of relative movement, and detects a movement of a magnified projected image which is formed by the second grating being magnified to a predetermined magnification, based on the relative movement, and to output periodic signals according to the amount of relative displacement of the scale.

As shown in FIG. 8, a light absorbing member is used for the optical pattern 161. The optical pattern 161 is stuck to the light transmitting resin 160. Here, relationships in expressions from expression 1 to expression 6 hold true similarly as in the first embodiment.

An operation of the second embodiment, basically, is similar to the action of the first embodiment. Even in the second embodiment, a light absorbing member is used for the optical pattern 161. Moreover, the optical pattern 161 is stuck to the light transmitting resin 160. Therefore, reflected light is absorbed, and light reaching the light receiving surface of the photodetector 140 upon being reflected inside the light transmitting resin 160 is reduced. Moreover, the transmitted light is also absorbed by the optical patter 161. Therefore, external light reaching the light receiving surface of the photodetector 140 is reduced, and light leaked to the exterior is reduced.

In the second embodiment, regarding effect other than effect related to the bare LED, similar effect as in the first embodiment is achieved. As an effect peculiar to the second embodiment, by integrating the light transmission substrate 150 having the photodetector 140 and the third grating in the first embodiment, with the PD array 141, the number of components is decreased, and the mounting becomes simple.

Moreover, a manufacturing accuracy of the PD array manufactured by a semiconductor process is far higher than a mounting accuracy of the third grating. Therefore, deterioration of the signals can be reduced. Moreover, it was difficult in a case in which, a light transmitting member having a third grating has been used, by letting it to be the PD array, it becomes easy to put together four phase groups at one place. Consequently, the required area of the light receiving surface can be reduced.

Therefore, as compared to a case in which the light receiving section is separated apart at four locations, the effect of a phase shift due to a shift in rotation is far smaller. As a result, the tolerances in rotation angles are improved in assembling and installation. Moreover, the required area of the light receiving surface can be reduced. Therefore, more compact structure becomes possible.

In the second embodiment, the first grating 131 is beside the light source of the detecting head, the PD array 141 is beside the photodetector 140, and the second grating 171 is on the scale 170. The PD array 141 has a structure in which, a light receiving element and the third grating in the triple-grating encoder are integrated compactly and highly accurately, and is ranked as an improved version of the triple-grating encoder. It is highly accurate similar to the triple-grating encoder.

In the second embodiment, since an arrangement of four phase detecting portions is overlapping as compared to the triple-grating encoder, it has larger tolerances in rotation angles when the components are mounted and when the scale rotates.

Furthermore, the PD array 141 is manufactured by using a photolithography technology. Therefore, manufacturing of a portion of the PD array 141 is easy. Besides, dimensions and arrangement of various portions is accurate as compared to the plurality of light receiving sections of the triple-grating encoder. Therefore, it is possible to improve an accuracy of mounting of the detecting head as a whole, and to reduce an accuracy of mounting of other portions to be mounted when the accuracy of mounting which has been sought in head mounting is fixed, as compared to the triple-grating encoder.

Moreover, by replacing by the mold Led 120 of the surface-mounting type for the light source, electrode wires are put together on the substrate 110, and gold wires etc. become unnecessary, and the structure becomes simple.

The mold LED has also an advantage that it has a high reliability and it is easy to handle.

Third Embodiment

Figure 9:
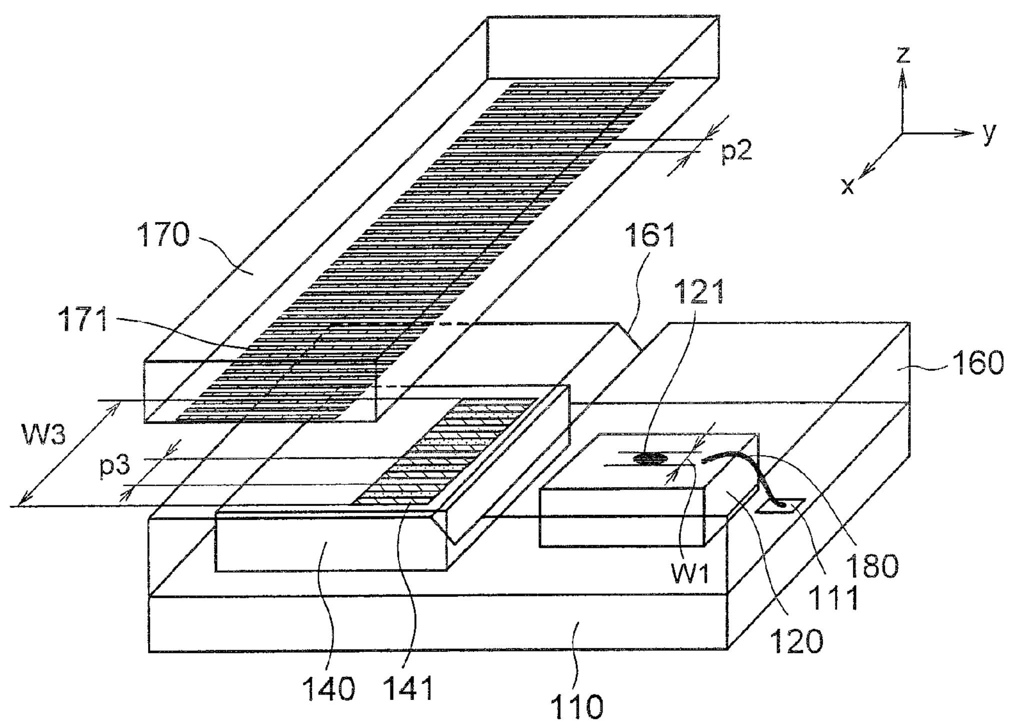
FIG. 9 is a diagram showing a perspective view of an optical encoder according to a third embodiment of the present invention.
Figure 10:
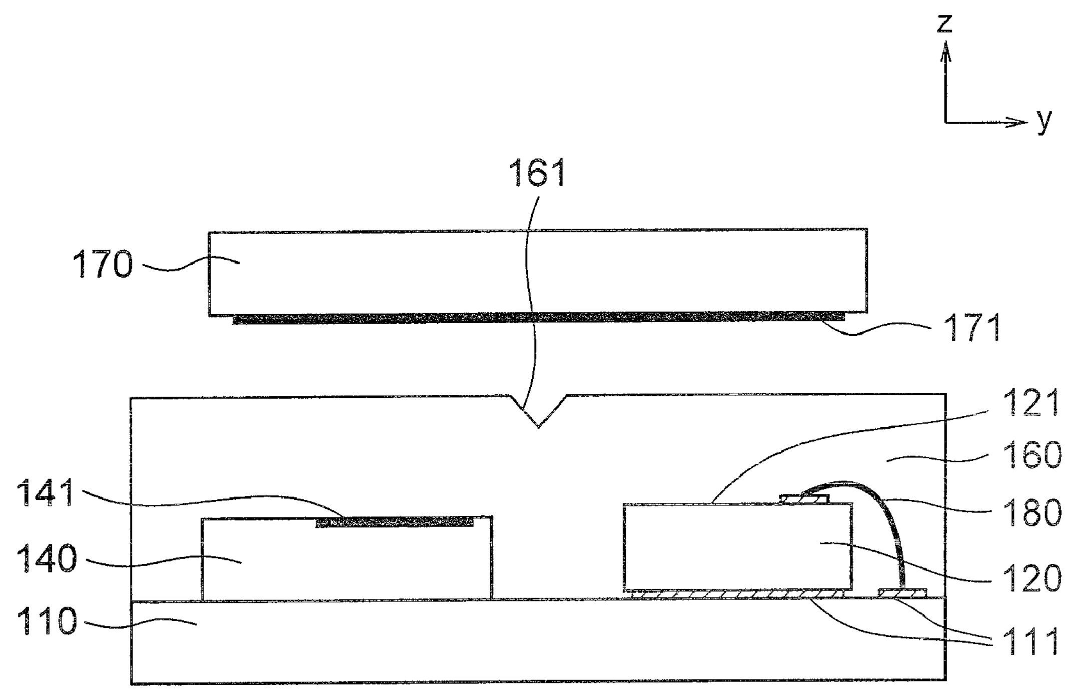
FIG. 10 is a diagram showing a cross-sectional view of the optical encoder according to the third embodiment.

Next, an optical encoder according to a third embodiment of the present invention will be described below. The same reference numerals are assigned to the components which are the same as in the first embodiment and the second embodiment, and repeated description is omitted. FIG. 9 and FIG. 10 show a perspective view and a cross-sectional view respectively, of the optical encoder of the third embodiment.

In the third embodiment, instead of the light source in the second embodiment, a surface emitting laser 120 having an effective width W1 in a direction of the scale and a circular-shaped light emerging window 121, are used. Moreover, the light transmission substrate 130 is eliminated. A light emerging portion in the form of a wire of the surface emitting laser 120 also serves as a first grating. The effective width of the light source is let to be such that, W1<p3/2.

Figure 11:
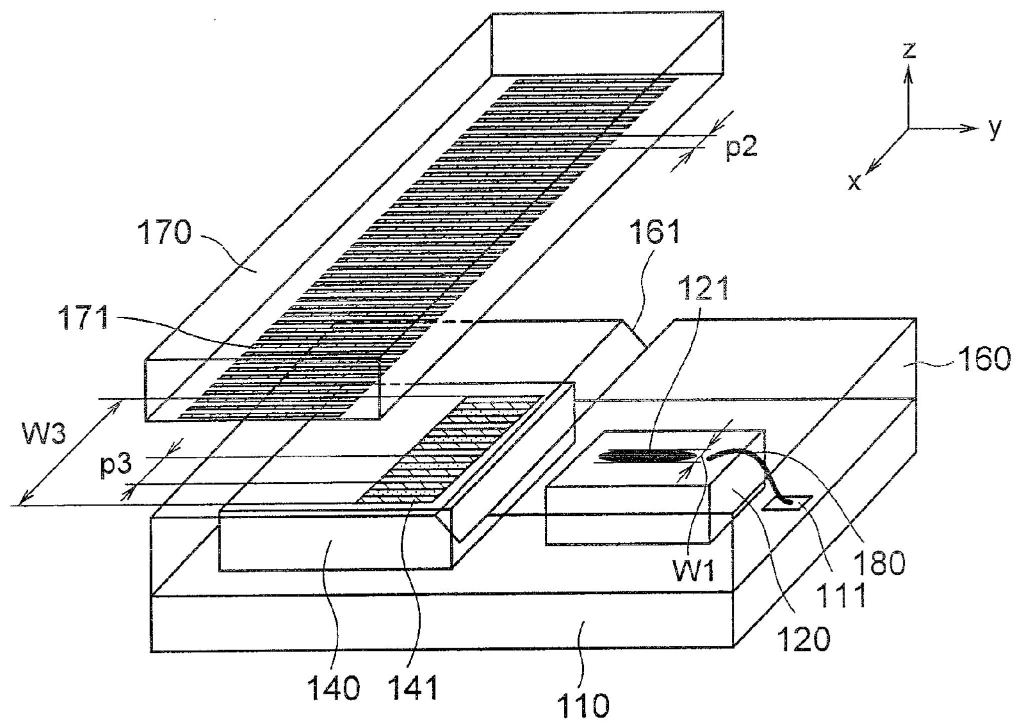
FIG. 11 is a diagram showing perspective view of an optical encoder according to a modified embodiment of the third embodiment.

The rest of the structure is common as the second embodiment. In the third embodiment, the surface emitting laser 120 in the form of a wire is used as a light source. However, as shown in FIG. 11, an LED and a surface emitting laser having an elliptical shape of a light emerging window or a light emerging window in the form of a wire may be used.

In the third embodiment, as shown in FIG. 10, as the optical pattern 161, a V-groove is provided in the light transmitting resin 160. Here, relationships in expressions from expression 1 to expression 6 hold true similarly as in the second embodiment.

Figure 12:
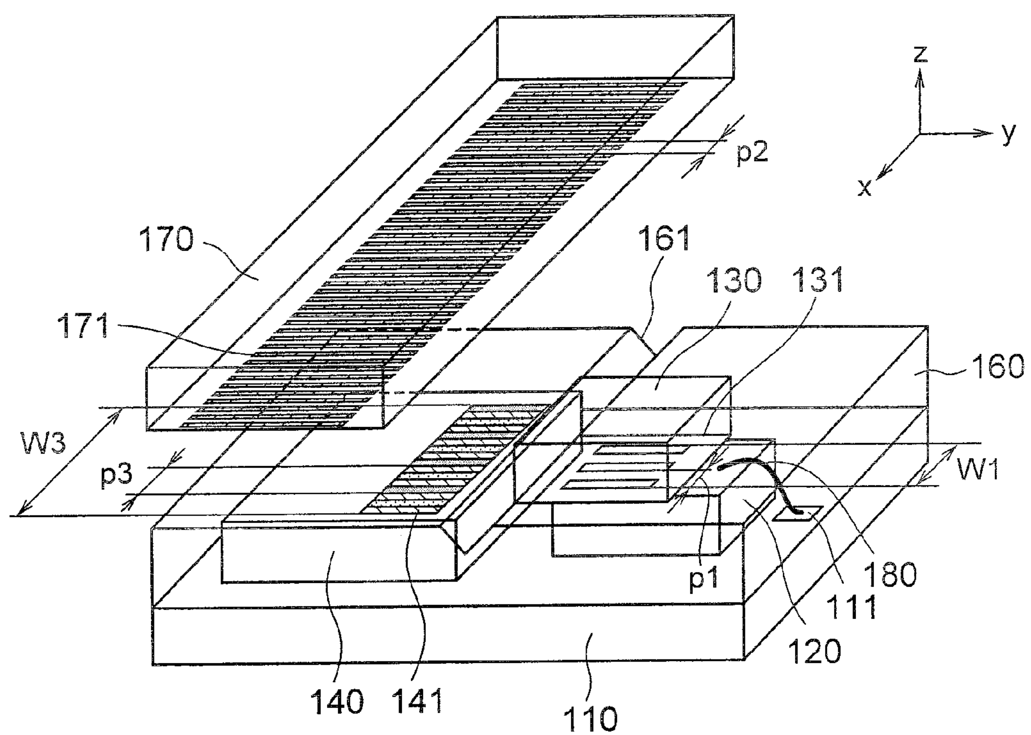
FIG. 12 is a diagram showing a perspective view of an optical encoder according to another modified embodiment of the third embodiment.

Moreover, in a case in which, the effective width of a light emerging window of the light source becomes large, the light transmission substrate 130 having the first grating 131 as shown in FIG. 12 may be mounted on the light source in order to keep small the effective width of the light emerging window of the light source, though the number of the members increases.

An optical pattern in the third embodiment is not restricted to have the abovementioned structure. It may be any structure provided that it serves the purpose such as to reduce light which is incident on the optical detector upon being internally reflected inside the light transmitting resin 160 after being emitted from the light source, and to reduce external light incident on the photodetector, and light leaked to the exterior. Moreover, the method of manufacturing is also not restricted to any particular method.

For example, a plurality of optical patterns having the same function may be disposed, or optical patterns having different functions may be combined and disposed. Moreover, the shape of the optical pattern 161 in FIG. 10 may be let to be a lens shape having a concavity in a lower direction, and a cylindrical lens shape.

Figure 18:
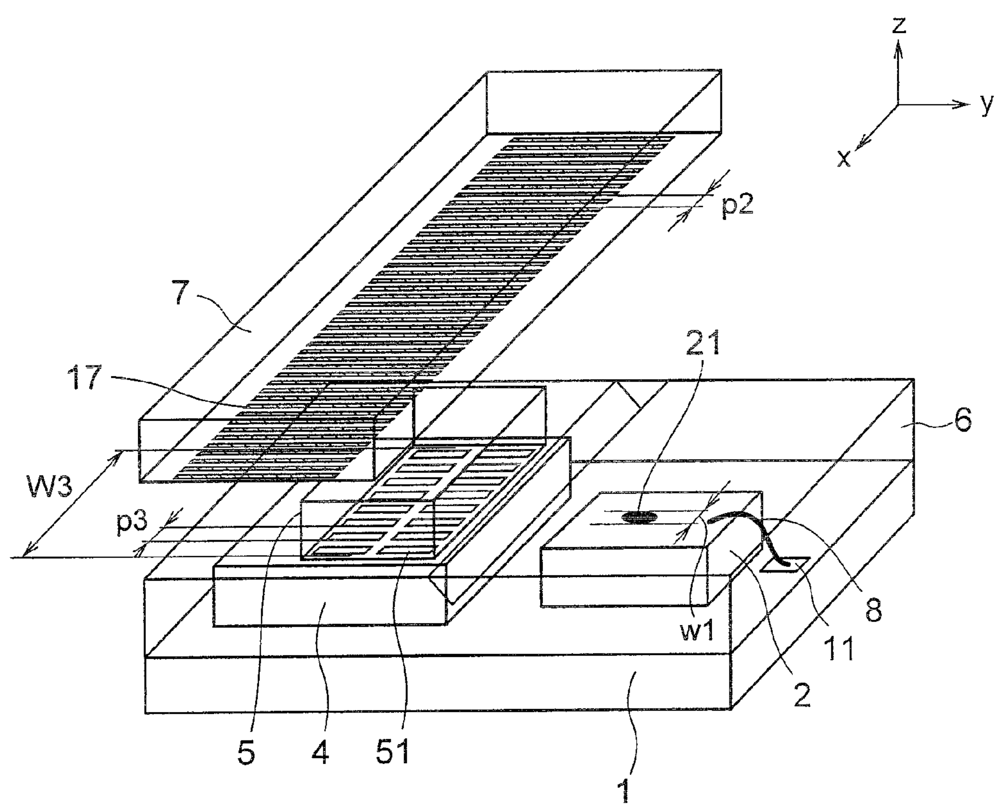
FIG. 18 is a diagram showing a perspective view of an optical encoder according to another modified embodiment of the third embodiment.

In the third embodiment, the PD array is used for the photodetector similarly as in the second embodiment. However, it may be replaced by a photodetector having four light receiving sections and a light transmission substrate having the third grating as in the first embodiment, as shown in FIG. 18.

The functions of an encoder in the third embodiment are similar to those in the second embodiment. In the third embodiment, a V-groove is adopted for the optical pattern 161. Light which has reached the V-groove in the surface of the light transmitting resin 160 is transmitted to the exterior from there, and is reflected in a direction different from the light receiving section. Therefore, the reflected light is absorbed, and light reaching the light receiving surface of the photodetector 140 upon being reflected inside the light transmitting resin 160 is reduced.

Moreover, since the transmitted light is also absorbed by the optical pattern 161, the external light reaching the light receiving surface of the photodetector 140 is reduced, and light leaked to the exterior is reduced.

In the third embodiment, the same effects as those in the second embodiment are achieved. Furthermore, as the light transmission substrate 130 becomes unnecessary, the structure becomes simple. Since there is no interference between the electroconductive wire 8 and the light transmission substrate 130 during mounting, the mounting becomes easier.

The third embodiment is an encoder in which a so-called Talbot interference in which, a point light source is used, is used. Even in this example, the light detecting section is structured to have a predetermined optical grating function having a third pitch p3 with respect to the direction of relative movement, and to detect the movement of a magnified projected image which is formed by the second grating being magnified to a predetermined magnification, based on the relative movement, and to output periodic signals according to the amount of relative displacement of the scale. Highly accurate position detection similarly as the triple-grating encoder is possible. Besides, as compared to the triple-grating encoder, since the first grating is not necessary, the number of members is reduced, and it is not necessary any more to arrange the position and angle of the first grating, and to reduce the shift in rotation in particular. Therefore, the manufacturing becomes easy, and an improvement in the yield can be anticipated.

Moreover, as shown in FIG. 18, a similar effect can be exerted even when the PD array which is an optical detector is replaced by an optical detector having four light receiving sections and the light transmission substrate having the third grating as in the first embodiment.

Fourth Embodiment

Figure 13:
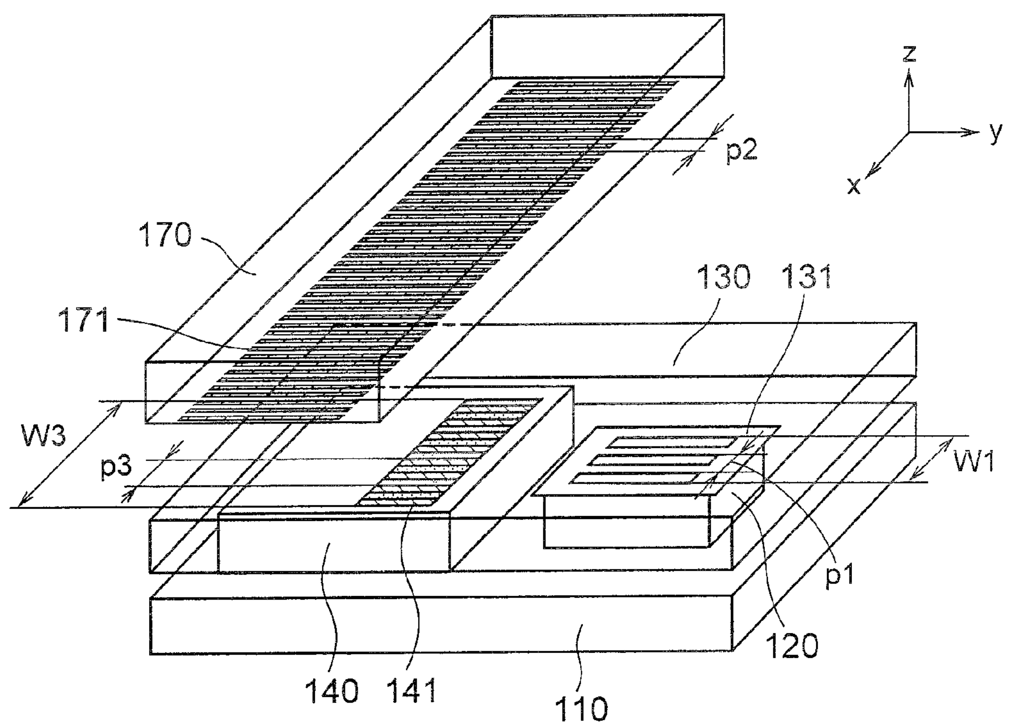
FIG. 13 is a diagram showing a perspective view of an optical encoder according to a fourth embodiment of the present invention.
Figure 14:
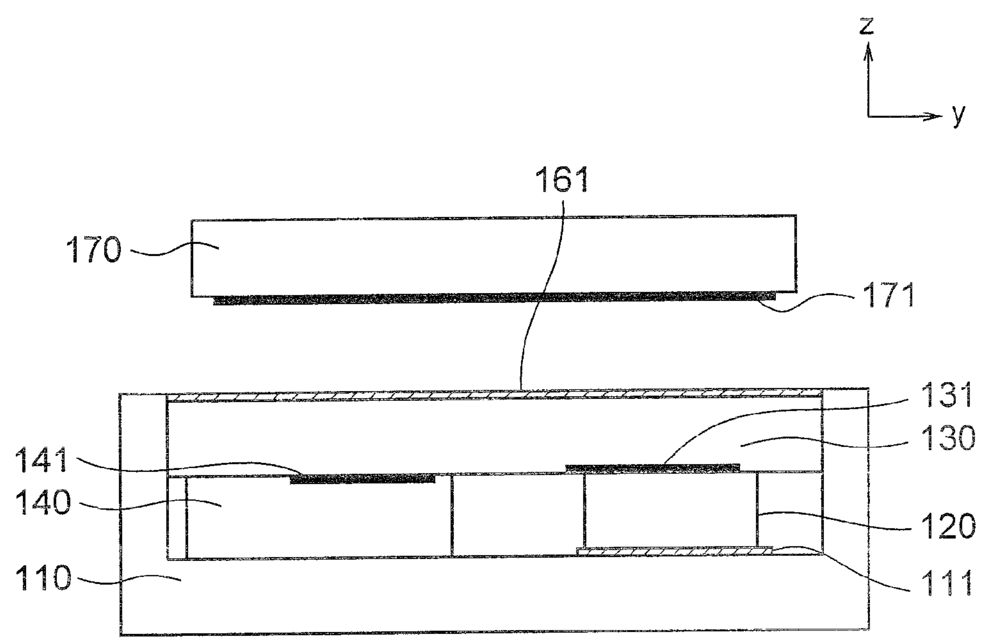
FIG. 14 is a diagram showing a cross-sectional view of the optical encoder according to the fourth embodiment.
Figure 15:
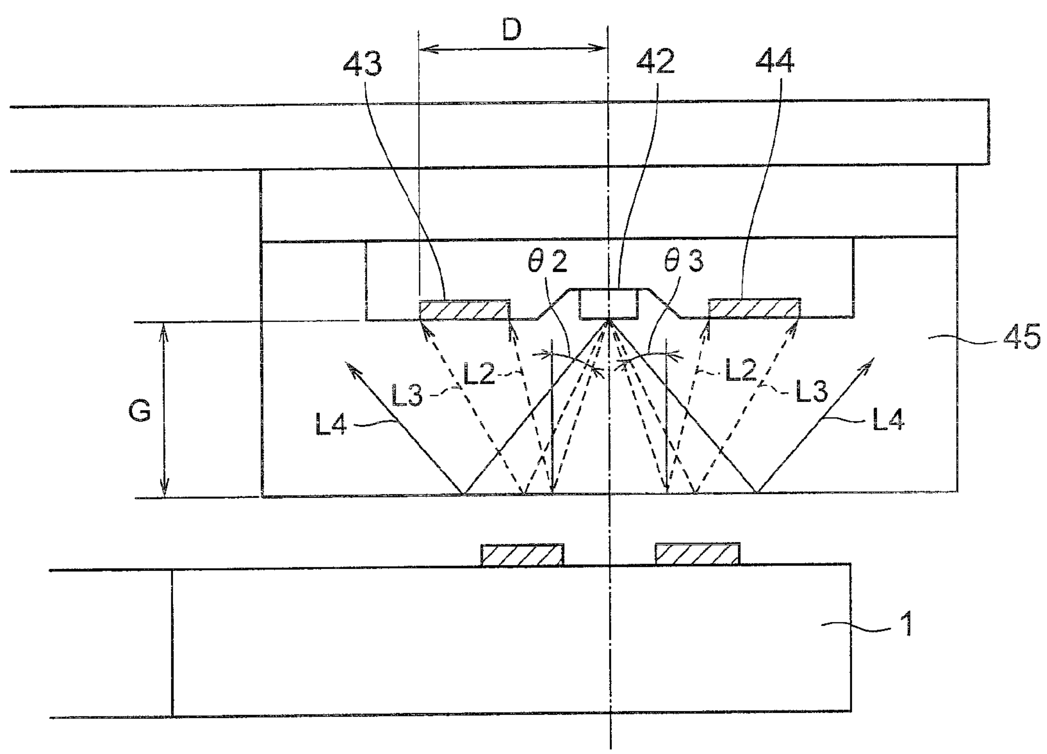
FIG. 15 is a diagram showing a cross-sectional view of an optical encoder of a prior art.

Next, an optical encoder according to a fourth embodiment of the present invention will be described below. The same reference numerals are assigned to the components which are the same as in the embodiments from the first embodiment to the third embodiment, and repeated description is omitted. FIG. 13 and FIG. 14 show a perspective view and a cross-sectional view respectively of the optical encoder of the fourth embodiment.

In the fourth embodiment, a substrate having a box shape is used as the substrate 110 which is a common substrate in the second embodiment. Moreover, instead of the mold resin, the light transmission substrate 130 which is a plane and parallel plate formed of glass is adhered on the mold LED 120 of the surface-mounting type and the photodetector 140.

The first grating 131 is formed at an upper portion of a light emerging portion of the mold LED 120 of the surface-mounting type, of the light transmission substrate 130 which is a plane and parallel plate. Furthermore, a lower surface of the light transmission substrate 130 which is a plane and parallel plate is shielded from light, excluding a portion around a light receiving area of the photodetector and the first grating 131.

In FIG. 13, for ease of understanding, description of a side-surface portion of the substrate 110, which is a common substrate having a box shape, is omitted, and regarding a pattern provided on the light transmission substrate 130 having a plane and parallel plate, only a pattern of the first grating 131 on an upper portion of the light emerging portion of the mold LED 120 is indicated.

The light transmission substrate 130 which is a plane and parallel plate is disposed almost parallel to a bottom surface of the substrate 110 which is a common substrate. Moreover, an amount of adhesive is increased such that there is no gap on the photodetector 140 and the mold LED 120 of the surface-mounting type, or the gap is filled by a light transmitting resin or an adhesive.

In a portion between the substrate 110 which is a common substrate and the light transmission substrate 130 which is a plane and parallel plate, in which, the LED 120 and the photodetector 140 do not exist, air or an inert gas may be filled, or a vacuum may be formed, or a resin may be filled. In a case of filling a resin, a resin having a low optical transmittance, or an opaque resin may be used provided that the resin does not have any effect on the optical path.

As shown in FIG. 14, as the optical pattern 161, a reflection preventing film is provided on entire surface on the upper side of the light transmission substrate 130 which is a plane and parallel plate. The reflection preventing film is formed such that, the reflection preventing effect of the film is exerted particularly in the intermediate portion between the two portions where the upper surface of the light transmission substrate 130, which is a plane parallel plate, intersects with the optical paths from the light emitting section of the bare LED 120 up to the surface of the scale and from the surface of the scale up to the light receiving surface.

Similarly as in the second embodiment, for the structure in which, the light transmitting resin is replaced by a plane and parallel plate, relationships in expressions from expression 1 to expression 2 hold true.

As a variation in the third embodiment, the structure may be such that the photodetector 140 having the PD array 141 is replaced by the photodetector 140, and the third grating 151 is added to the light transmission substrate 130 which is a plane and parallel plate. Moreover, the light transmission substrate 130, which is a plane and parallel plate, may be divided into two, one beside the light source and the other beside the PD array.

An action of the fourth embodiment is common as the action of the second embodiment. In the fourth embodiment, as the optical pattern 161, the reflection preventing film is used on the upper surface of the light transmission substrate 130 which is a plane and parallel plate. Most part of light which has reached the surface of the light transmitting resin 160 is transmitted to the exterior. Therefore, the reflected light is absorbed, and the light reaching the light receiving surface of the photodetector 140 upon being reflected at the internal portion of the light transmitting resin 160 is reduced. Moreover, since the transmitted light is also absorbed by the optical pattern 161, the external light reaching the light receiving surface of the photodetector 140 is reduced, and the light leaked to the exterior is reduced.

Moreover, in the fourth embodiment, the same effects as those in the second embodiment are achieved. Furthermore, in the fourth embodiment, by using the light transmission substrate 130 which is a plane and parallel plate instead of a resin, the profile irregularity and flatness of the interface directed from the detecting head to the scale 170 is improved. Therefore, detection with even higher accuracy becomes possible. Moreover, since the light transmission substrate 130 which is a plane and parallel plate is made of glass, a scratch is hard to be developed on the surface, and a crack due to a temperature change does not occur easily. Furthermore, the first grating 131 is formed on a surface toward the mold LED 120 of the surface-mounting type of the light transmission substrate 130 which is a plane and parallel plate of glass not deformed during mounting. The detecting head is sealed by the plane and parallel plate of glass and it is possible to impart a function as an optical grating to the light transmissions substrate 130 for sealing, and it becomes possible to reduce the number of members.

Fifth Embodiment

Figure 16:
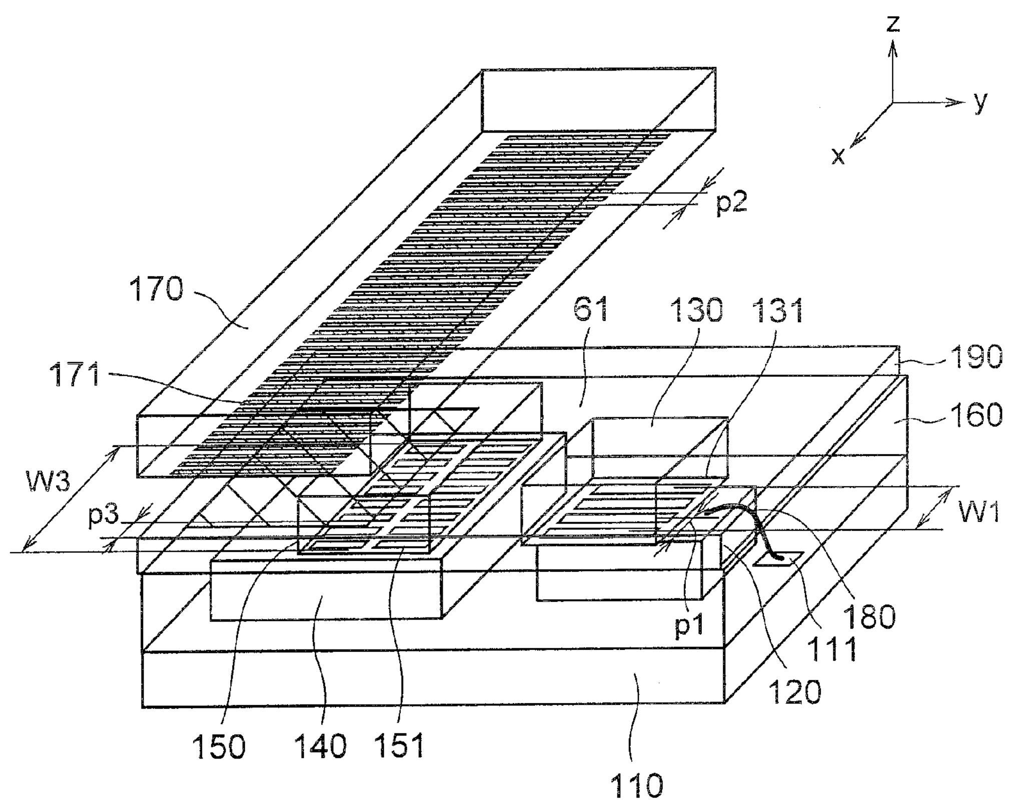
FIG. 16 is a diagram showing a perspective view of an optical encoder according to a fifth embodiment of the present invention.
Figure 17:
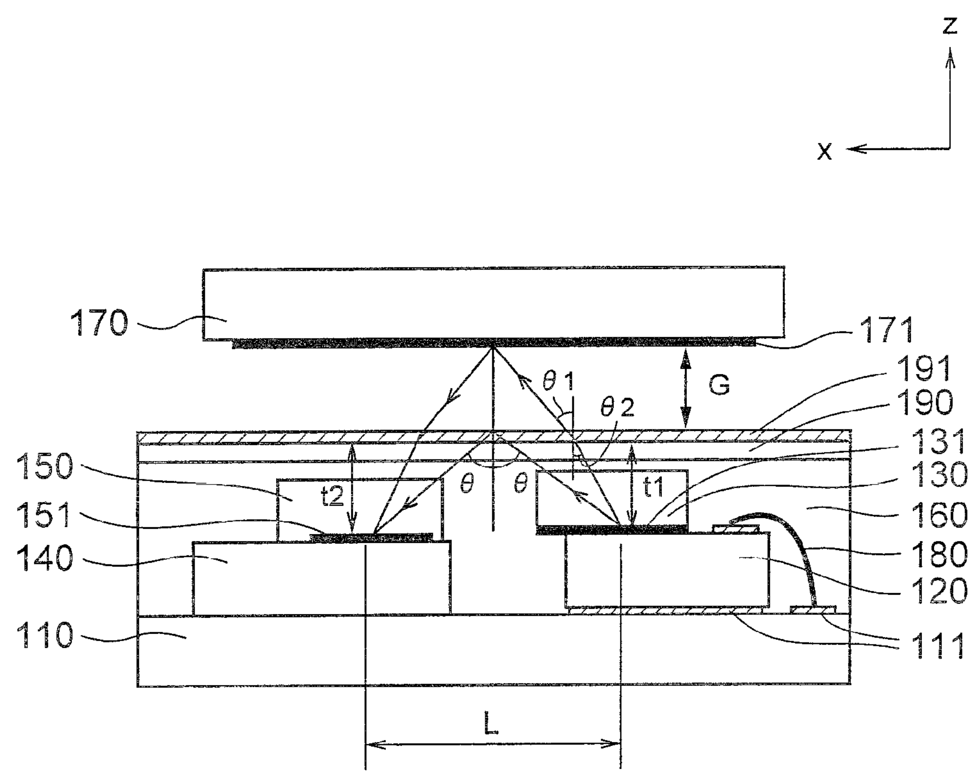
FIG. 17 is a diagram showing a cross-sectional view of the optical encoder according to the fifth embodiment.

An optical encoder according to a fifth embodiment of the present invention will be described below. The same reference numerals are assigned to the components which are the same as in the embodiments from the first embodiment to the fourth embodiment, and repeated description is omitted. FIG. 16 and FIG. 17 show a perspective view and a cross-sectional view respectively of the optical encoder of the fifth embodiment.

The fifth embodiment is an embodiment in which, in the first embodiment, the optical pattern on the upper surface of the resin 160 is eliminated, and a light transmission substrate 190 which is a plane and parallel plate of glass having an optical pattern thereon is mounted.

The light transmission substrate 190 which is a plane and parallel plate is disposed almost parallel to the bottom surface of the substrate 110 which is a common substrate. The mounting is carried out such that there is no gap between the resin 160 and the light transmission substrate 190.

As shown in FIG. 17, as an optical pattern 191, a reflection preventing film is provided on the entire surface on the upper side of the light transmission substrate 190 which is a plane and parallel plate. The reflection preventing film is formed such that, the reflection preventing effect of the film is exerted particularly in the intermediate portion between the two portions where the upper surface of the light transmission substrate 130, which is a plane parallel plate, intersect with the optical paths from the light emitting section of the bare LED 120 up to the surface of the scale and from the surface of the scale up to the light receiving surface.

Similarly as in the second embodiment, for the structure in which, the light transmitting resin is replaced by a plane and parallel plate, relationships in expressions from expression 1 to expression 6 hold true. As a variation in the fifth embodiment, the structure may be such that the light transmission substrate 150 having the photodetector 140 and the third grating 151 is replaced by a photodetector 140 having the PD array 141. Moreover, the light transmission substrate 190 which is a plane and parallel plate may be divided into two, one beside the light source and the other beside the PD array.

An action of the fifth embodiment is common as the action of the first embodiment. In the fifth embodiment, as the optical pattern 191, the reflection preventing film is used on the upper surface of the light transmission substrate 190 which is a plane and parallel plate. Most part of light which has reached the surface of the light transmission substrate 190 is transmitted to the exterior. Therefore, as a case in which the optical pattern 191 is not there, the reflected light is reduced, and light reaching the light receiving surface of the photodetector 140 upon being reflected inside the light transmission substrate 190 is reduced.

Furthermore, in the fifth embodiment, by using the light transmission substrate 190 which is a plane and parallel plate on the upper portion of the resin 160, the profile irregularity and flatness of the interface directed from the detecting head to the scale 170 is improved. Therefore, detection with even higher accuracy becomes possible. Moreover, since the light transmission substrate 190 which is a plane and parallel plate is made of glass, a scratch is hard to be developed on the surface, and a crack due to a temperature change does not occur easily.

Furthermore, the detecting head, first of all, is covered by a resin. Therefore, it is advantageous from a point of view of protection of members inside the head including protection of a side-surface portion. Moreover, by eliminating any portion in which air enters inside the detecting head, it becomes stronger with respect to a pressure fluctuation. For example, a deformation and a damage of the light transmission substrate 190 which is glass are hard to occur, and it is advantageous for dealing with vacuum.

The present invention may take various modified embodiments which fairly fall within the basic teaching herein set forth.

Industrial Applicability

As it has been described above, an optical encoder according to the present invention is useful particularly for an optical encoder of triple-slit type or an optical encoder of a Talbot-interference type in which, particularly, a point light source or a line light source is used.

The invention claimed is:

1. An optical encoder comprising:

a scale which is installed on one member of which, a displacement is detected; and a detecting head which is installed on the other member which moves relatively with respect to the first member, and which is disposed facing the scale, wherein the scale is provided with a predetermined optical pattern in the direction of relative movement, and the detecting head is provided with a light emitting section which irradiates predetermined light to the scale, a light detecting section which includes a light receiving surface which receives light reflected by the optical pattern upon being irradiated to the scale from the light emitting section, and which detects the light distribution formed on the light receiving surface, and a light transmitting member which is disposed on a surface of the light emitting section and a surface of the light detecting section, toward the scale, and a light propagation controlling pattern for controlling light propagation induced by reflection of light which travels from the light emitting section up to the light detecting section, is disposed on at least a part of a surface of the light transmitting member, facing the scale.

2. The optical encoder according to claim 1, wherein the light propagation controlling pattern is disposed at an intermediate portion of the surface of the light transmitting member between the two portions where the surface of the light transmitting member intersects with the optical paths related to the displacement detection from the light emitting section up to the surface of the scale and from the surface of the scale up to the light detecting section.

3. The optical encoder according to claim 1, wherein the light transmitting member is a resin which is filled with when the detecting head is being mounted.

4. The optical encoder according to claim 1, wherein the light transmitting member is a plane parallel plate which is not deformed when the detecting head is being mounted.

5. The optical encoder according to claim 1, wherein the light transmitting member is made of two or more members.

6. The optical encoder according to claim 1, wherein the detecting head has a substrate at a farthest position from the scale, and the light source, the light detecting section, and the light transmitting member are disposed and formed integrally on the substrate.

7. An optical encoder comprising:

a scale which is installed on one member of which, a displacement is detected; and a detecting head which is installed on the other member which moves relatively with respect to the first member, and which is disposed facing the scale, wherein the scale is provided with a predetermined optical pattern in the direction of relative movement, and the detecting head is provided with a light emitting section which irradiates predetermined light to the scale, a light detecting section which includes a light receiving surface which receives light reflected by the optical pattern upon being irradiated to the scale from the light emitting section, and which detects the light distribution formed on the light receiving surface, and a light transmitting member which is disposed on a surface of the light emitting section and the light detecting section, toward the scale, and a light propagation controlling pattern for controlling propagation of light is disposed on at least a part of a surface of the light transmitting member, facing the scale, wherein the light propagation controlling pattern is disposed on a portion of a surface of the light transmitting member, which does not contribute directly to any encoder signal.

8. The optical encoder according to claim 7, wherein the light propagation controlling pattern is disposed at an intermediate portion of the surface of the light transmitting member between the two portions where the surface of the light transmitting member intersects with the optical paths related to the displacement detection from the light emitting section up to the surface of the scale and from the surface of the scale up to the light detecting section.

9. The optical encoder according to claim 7, wherein the light transmitting member is a resin which is filled with when the detecting head is being mounted.

10. The optical encoder according to claim 7, wherein the light transmitting member is a plane parallel plate which is not deformed when the detecting head is being mounted.

11. The optical encoder according to claim 7, wherein the light transmitting member is made of two or more members.

12. The optical encoder according to claim 7, wherein the detecting head has a substrate at a farthest position from the scale, and the light source, the light detecting section, and the light transmitting member are disposed and formed integrally on the substrate.

13. An optical encoder comprising:

a scale which is installed on one member of which, a displacement is detected; and a detecting head which is installed on the other member which moves relatively with respect to the first member, and which is disposed facing the scale, wherein the scale is provided with a predetermined optical pattern in the direction of relative movement, and the detecting head is provided with a light emitting section which irradiates predetermined light to the scale, a light detecting section which includes a light receiving surface which receives light reflected by the optical pattern upon being irradiated to the scale from the light emitting section, and which detects the light distribution formed on the light receiving surface, and a light transmitting member which is disposed on a surface of the light emitting section and the light detecting section, toward the scale, and a light propagation controlling pattern for controlling propagation of light is disposed on at least a part of a surface of the light transmitting member, facing the scale, wherein the light propagation controlling pattern is a pattern for controlling at least light propagation induced by reflection, for a path of light from the light emitting section up to the light detecting section via the light propagation controlling pattern of the surface of the light transmitting member, if it were not for the light propagation controlling pattern, an angle at which at least a part of the light passing through the path of light is incident on the surface of the light transmitting member, would be larger than a critical angle of total reflection at an interface between the light transmitting member and the exterior.

14. The optical encoder according to claim 13, wherein the surfaces of the light emitting section and the light detecting section toward the scale are covered entirely and integrally with the light transmitting member, and the upper surface of the light transmitting member is substantially flat, and when the distance from the light emitting section up to the surface of the light transmitting member is let to be t1, the distance from the light detecting section up to the surface of the light transmitting member is let to be t2, the component, parallel to the surface of the scale, of the farthest distance between a position on the light emitting section and a position on the light detecting section is let to be L, the refractive index of the exterior is let to be n1, and the refractive index of the light transmitting member is let to be n2, $\mathrm{Arc\,Tan}\,[L/(t1+t2)] \leqq \mathrm{Arc\,Sin}(n1/n2)$ is satisfied.

15. An optical encoder comprising:

a scale which is installed on one member of which, a displacement is detected; and a detecting head which is installed on the other member which moves relatively with respect to the first member, and which is disposed facing the scale, wherein the scale is provided with a predetermined optical pattern in the direction of relative movement, and the detecting head is provided with a light emitting section which irradiates predetermined light to the scale, a light detecting section which includes a light receiving surface which receives light reflected by the optical pattern upon being irradiated to the scale from the light emitting section, and which detects the light distribution formed on the light receiving surface, and a light transmitting member which is disposed on a surface of the light emitting section and the light detecting section, toward the scale, and a light propagation controlling pattern for controlling light propagation induced by transmission using any one of a high-reflection pattern, a light absorption pattern and the direction of reflection bending pattern, is disposed on at least a part of a surface of the light transmitting member, facing the scale.

* * * * *